US006965690B2

(12) United States Patent
Matsumoto

(10) Patent No.: US 6,965,690 B2
(45) Date of Patent: Nov. 15, 2005

(54) THREE-DIMENSIONAL MODELING APPARATUS, METHOD, AND MEDIUM, AND THREE-DIMENSIONAL SHAPE DATA RECORDING APPARATUS, METHOD, AND MEDIUM

(75) Inventor: Yukinori Matsumoto, Tsukuba (JP)

(73) Assignee: Sanyo Electric Co., Ltd., Osaka (JP)

( * ) Notice: Subject to any disclaimer, the term of this patent is extended or adjusted under 35 U.S.C. 154(b) by 670 days.

(21) Appl. No.: 09/847,011

(22) Filed: May 1, 2001

(65) Prior Publication Data

US 2002/0164066 A1 Nov. 7, 2002

(51) Int. Cl.$^7$ .......................... G06K 9/00; G06T 17/00; G01C 3/14
(52) U.S. Cl. ........................ 382/154; 345/420; 356/12
(58) Field of Search . 382/154; 345/420; 348/136–139; 356/3.1, 12

(56) References Cited

U.S. PATENT DOCUMENTS 6,611,617 B1 * 8/2003 Crampton ................... 382/154

FOREIGN PATENT DOCUMENTS

JP          1196361        4/1999

OTHER PUBLICATIONS

Niem, W. "Error Analysis for Silhouette-Based 3D Shape Estimation from Multiple Views", Internation Workshop On Synthetic-Natural Hybrid Coding and 3D Imaging, Sep. 1997.*

Battle et al. "Recent Progress in Coded Structure Light as a Technique to Solve the Correspondence Problem: A Survey", 1998 Pattern Recognition, vol. 31, No. 7 pp. 963-982.*

Reed, M. "Solid Model Acquistion from Range Imagery", Ph. D. Thesis (Columbia University), 1998, pp. 16-20.*

Tosovic, et al., "On Combining Shape from Silhouette and Shape from Structured Light", 2002, Proceedings of the 7th Computer Vision Winter Workshop, pp. 108-118.*

Tosovic, S. "Construction of 3D Models of Objects Using Combination of Shape from Silhouette and Shape from Structured Light", Jul. 2001, Vienna University of Technology Pattern Recognition and Image Processing Group Technical Report PRIP-TR-099.*

Lauentini, A. "The Visual Hull Concept of Silhouette Based Image Understanding", Feb. 1994, IEEE Transactions on PAM vol. 16. No. 2.*

Hall-Holt, et al. "Stripe Boundary Codes for Real-Time Structured Light Range Scanning of Moving Objects", IEEE ICCV 2001, vol. 2.*

(Continued)

*Primary Examiner*—Amelia M. Au
*Assistant Examiner*—Wes Tucker
(74) *Attorney, Agent, or Firm*—Pillsbury Winthrop Shaw Pittman LLP

(57) ABSTRACT

A three-dimensional shape modeling of a real object that reduces the limitations on the target shape and color. The rough shape of the target object is determined by a silhouette method (which has limitation on the target shape) and, at the same time, the detailed shape of the target object is determined by a triangulation method or the like (which has limitation on the target color). By using both sets of information, the consistency between the rough and detailed shape information are checked. For the portions where the consistency is not satisfied (points where detailed shape information is absent or points where detailed shape section is present outside the rough shape), rough shape is assumed to be the final object information and for other portions, the detailed shape is taken as the final object information. In this manner, three-dimensional shape modeling with reduced limitations on the target shape and color can be performed.

46 Claims, 17 Drawing Sheets

OTHER PUBLICATIONS

Chen, et al. "Range Data Acquistion Using Color Structured Lighting and Stereo Vision", 1997, Image and Vision Computing 1 (1997), pp. 445-456.*

Gonzalez and Woods, "Digital Image Prrocessing", 1992, Addison-Wesley, 1rst Ediion, pp. 187-189.*

Wojciech, et al. "Image-Based Visual Hulls", Jul. 2000, SIGGRAPH 2000: International Conference on Computer Graphics as Interactive Techniques Proceedings of the 27th annual conference on Computer graphics and Interactive Techniques, pp. 369 374.*

Seiji Inokuchi and Kosuke Sato, "Three-dimensional Image Measurement," Nov. 20, 1990 (with English translation of relevant parts).

Yukio Sato and Hiroichi Fujita, "Shape Measurement and Description of Curved Objects," *Electrical Communication Institute Paper*, vol. J62-D, No. 1, Jan. 1979 (with English abstract thereof).

* cited by examiner

ROUGH DEPTH MAP

DETAILED DEPTH MAP

FINAL DEPTH MAP

|  | Section vertex | |
|---|---|---|
|  | vertex_no 124 | |
| COORDINATE DATA SECTION FOR VERTICES | vid 0    (0.0, 20.0, 43.0) | r=1.0 |
|  | vid 1    (10.3, 5.2, 133.8) | r=0.5 |
|  | vid 2    (-20.9, 3.2, 13.9) | r=0.5 |
|  | vid 3    (-32.1, 30.4, -5.3) | r=1.0 |
|  | ........ | |
|  | Section polygon | |
|  | polygon_no 196 | |
| DATA SECTION FOR POLYGONS | pid 0    (0 1 2) | |
|  | pid 1    (0 1 3) | |
|  | pid 2    (0 2 4) | |
|  | ........ | |

(a1) (b1)

(a2) (b2)

THREE-DIMENSIONAL MODELING APPARATUS, METHOD, AND MEDIUM, AND THREE-DIMENSIONAL SHAPE DATA RECORDING APPARATUS, METHOD, AND MEDIUM

BACKGROUND OF THE INVENTION

1. Field of the Invention

The present invention relates to a three-dimensional modeling technique for producing three-dimensional shape data of a target from a plurality of image data of the target, and in particular to three-dimensional modeling apparatus, method, and medium, and three-dimensional shape data recording apparatus, method, and medium.

2. Description of the Related Art

Conventionally, it is widely known to use a silhouette method where three-dimensional shape is estimated from silhouette information of a target, a triangulation method using a laser light, or a space coding method where a plurality of black-and-white patterns are projected, as a method for producing various three-dimensional images.

In the silhouette method, the shape data is produced as follows. For example, the target is placed on a rotational table, a plurality of images are captured with a suitable angle difference, and a silhouette image of the target is determined for each of the images. Here, by using a background plate such as a blue background during the capturing process, silhouette images can be easily and stably obtained using a widely-known chroma key technique.

If the positional relationship between the rotational table and the capturing camera is accurately known in advance, a silhouette can be projected to the assumed three-dimensional space on the rotational table from each viewpoint. The space where all silhouettes are projected is extracted as the object region. In this manner, the three-dimensional shape of the target is estimated.

The triangulation method using a laser light, on the other hand, uses a laser light irradiating device having a basic structure as shown in FIG. 15. Specifically, as shown in FIG. 15, a beam shape laser light is converted to a slit light by a cylindrical lens and the direction of the slit light is altered using a galvano-mirror or a polygon mirror, to allow a two-dimensional scan.

The laser light irradiated onto the target in this manner is then captured by an image inputting section such as a camera. The laser light has a sufficiently larger intensity than a typical illumination light, and thus, the point (or line) of maximum luminance can be easily extracted from the input image. The positional relationship between the laser light source and the image inputting section is accurately measured in advance. If the angle of the mirror when the image is input is accurately known, the distance from the camera or the laser light source to the target can be calculated using the principle of triangulation.

In a space coding method, a plurality of black-and-white patterns such as the patterns shown in FIG. 9 are projected onto a target and the target is captured. Then, for each image, it is determined which of the black or white pattern is projected on each pixel. It is known that the accuracy can be improved by comparing the projected image with an image projected by a pattern obtained by inverting the patterns described above.

In this manner, when seven patterns are projected, for example, the image can be divided into a total of 128 strip regions. If the direction of the pattern and the direction of the camera towards the irradiating section are approximately perpendicular, the pattern sequence of each pixel and the direction of the light from the pattern projecting section can be associated. Thus, the distance between the camera or the laser light source to the target can be calculated based on the principle of triangulation.

In the above silhouette method, the three-dimensional shape can be estimated once the background and the target are separated and silhouette information is obtained. Thus, there is no limitation on the material or the color of the target. However, there is a problem that the three-dimensional shape of any shape that does not show a silhouette outline cannot be accurately estimated. Specific examples of such a shape include the internal section of a cup. This portion always corresponds to the internal silhouette of another portion and cannot be observed as a silhouette outline, and the three-dimensional shape cannot be accurately estimated by the silhouette method.

In the triangulation method using a laser light and space coding method, on the other hand, it is fundamentally necessary to irradiate light onto the target and distinguish between the irradiated and non-irradiated sections. However, in a black portion, for example, the hair portion of a person, this distinction is very difficult. Therefore, in the triangulation method using laser light and space coding method, it is difficult to obtain the three-dimensional shape information for materials and colors that absorb light. There is a solution to this problem using a very strong laser light, but when the target is a person, there will be a problem regarding safety.

In addition, because a plurality of patterns must be projected in time division in the space coding method, a high-speed data inputting operation is difficult. Similarly, in the triangulation method using a laser light, because only one laser beam can be irradiated and this one laser beam must be scanned, there is a problem that a high-speed data inputting operation is difficult.

SUMMARY OF THE INVENTION

According to the present invention, there is provided a three dimensional modeling apparatus for generating three dimensional shape data of a three dimensional object, comprising projection means for projecting pattern light onto the three dimensional object; image input means for inputting an image of the three dimensional object; rough shape calculation means for calculating a rough shape from the image; detailed shape calculation means for calculating a detailed shape from the image; and three dimensional shape data generating means for generating three dimensional shape data of the three dimensional object based on the rough shape and the detailed shape.

Further, there is provided a three dimensional modeling apparatus for generating three dimensional shape data of a three dimensional object, comprising projection means for projecting pattern light onto the three dimensional object; image input means for inputting an image of the three dimensional object; rough shape input means for inputting a rough shape of the three dimensional object; detailed shape calculation means for calculating a detailed shape from the image; and three dimensional shape data generating means for generating three dimensional shape data of the three dimensional object based on the rough shape and the detailed shape.

Still further, there is provided a three dimensional modeling apparatus for generating three dimensional shape data of a three dimensional object, comprising image input means for inputting an image of the three dimensional object, the image being obtained by projecting pattern light onto the three dimensional object; rough shape calculation means for calculating a rough shape from the image; detailed shape calculation means for calculating a detailed shape from the image; and three dimensional shape data generating means for generating three dimensional shape data of the three dimensional object based on the rough shape and the detailed shape.

Also, there is provided a three dimensional modeling apparatus for generating three dimensional shape data of a three dimensional object, comprising image input means for inputting an image of the three dimensional object, the image being obtained by projecting pattern light onto the three dimensional object; rough shape, input means for inputting a rough shape of the three dimensional object; detailed shape calculation means for calculating a detailed shape from the image; and three dimensional shape data generating means for generating three dimensional shape data of the three dimensional object based on the rough shape and the detailed shape.

Preferably, in the above three dimensional modeling apparatus, the three dimensional shape data generating means may determine the final three dimensional shape data based on the following rule; if the detailed shape exits inside the rough shape, then the detailed shape is the final three dimensional shape data of said object, otherwise the rough shape is taken as the final three dimensional shape data of said object.

Also, in the above three dimensional modeling apparatus, the three dimensional shape data generating means may obtain a region where the object surface can exist based on the rough shape, to generate three dimensional shape data of the three dimensional object based on the rough shape, the detailed shape, and the region where the object surface can exist.

Further, in the above three dimensional modeling apparatus, the detailed shape calculation means may obtain a plurality of object surface location candidates from the input image.

Still further, preferably, in the above three dimensional modeling apparatus, the detailed shape calculation means may set a region where the object surface cannot exist in a portion inside the rough shape and may determine a region inside the rough shape other than the region where the object surface cannot exist as a region where the object surface can exist, to generate three dimensional shape data of the three dimensional object based on the rough shape, the detailed shape, and the region where the object surface can exist.

Preferably, in the above three dimensional modeling apparatus, the three dimensional shape data generating means may determine a final object surface location candidate from a plurality of object surface location candidates based on a region where the object surface can exist and may generate three dimensional shape data of the three dimensional object based on the final object surface location candidate.

Also, in the above three dimensional modeling apparatus, the rough shape may be calculated by the rough shape calculation means based on silhouette information obtained from the object image input by the image input means.

According to the present invention, there is provided a three dimensional shape data recording apparatus for recording three dimensional shape data of a three dimensional object, comprising three dimensional shape data generation means for generating three dimensional shape data of the three dimensional object; three dimensional shape data reliability assigning means for assigning a data reliability evaluation value to each of the three dimensional shape data; and three dimensional shape data recording means for recording three dimensional shape data to which the reliability evaluation value is assigned in a medium.

Also, there is provided a three dimensional shape data recording apparatus for recording three dimensional shape data of a three dimensional object, comprising three dimensional shape data capturing means for capturing three dimensional shape data of the three dimensional object; three dimensional shape data reliability assigning means for assigning a data reliability evaluation value to each of the three dimensional shape data; and three dimensional shape data recording means for recording three dimensional shape data to which the reliability evaluation value is assigned in a medium.

Still further, there is provided a three dimensional modeling method for generating three dimensional shape data of a three dimensional object, comprising the steps of projecting pattern light onto the three dimensional object; inputting an image of the three dimensional object; calculating a rough shape from the image; calculating a detailed shape from the image; and generating three dimensional shape data of the three dimensional object based on the rough shape and the detailed shape.

Moreover, there is provided a three dimensional modeling method for generating three dimensional shape data of a three dimensional object, comprising the steps of: projecting pattern light onto the three dimensional object; inputting an image of the three dimensional object; capturing a rough shape of the three dimensional object; calculating a detailed shape from the image; and generating three dimensional shape data of the three dimensional object based on the rough shape and the detailed shape.

Still further, there is provided a three dimensional modeling method for generating three dimensional shape data of a three dimensional object, comprising the steps of inputting an image of the three dimensional object, the image being obtained by projecting pattern light onto the three dimensional object; calculating a rough shape from the image; calculating a detailed shape from the image; and generating three dimensional shape data of the three dimensional object based on the rough shape and the detailed shape.

Further, there is provided a three dimensional modeling method for generating three dimensional shape data of a three dimensional object, comprising the steps of inputting an image of the three dimensional object, the image being obtained by projecting pattern light onto the three dimensional object; capturing a rough shape of the three dimensional object; calculating a detailed shape from the image; and generating three dimensional shape data of the three dimensional object based on the rough shape and the detailed shape.

In the above three dimensional modeling method, the step of generating three dimensional shape data may include determining the final three dimensional shape data based on the following rule; if the detailed shape exits inside the rough shape, then the detailed shape is the final three dimensional shape data of said object, otherwise the rough shape is taken as the final three dimensional shape data of said object.

Further, in the above three dimensional modeling method, the step of generating three dimensional shape data may include obtaining a region where the object surface can exist based on the rough shape, to generate three dimensional shape data of the three dimensional object based on the rough shape, the detailed shape, and the region where the object surface can exist.

Preferably, in the above three dimensional modeling method, the step of calculating detailed shape may include obtaining a plurality of object surface location candidates from the input image.

Also, in the above three dimensional modeling method, the step of calculating detailed shape may include setting a region where the object surface cannot exist in a portion inside the rough shape and determining a region inside the rough shape other than the region where the object surface cannot exist as a region where the object surface can exist, to generate three dimensional shape data of the three dimensional object based on the rough shape, the detailed shape, and the region where the object surface can exist.

Further, in the above three dimensional modeling method, the step of generating three dimensional shape data may include determining a final object surface location candidate from a plurality of object surface location candidates based on a region where the object surface can exist and generating three dimensional shape data of the three dimensional object based on the final object surface location candidate.

Preferably, in the above three dimensional modeling method, the rough shape may be calculated by the rough shape calculation means based on silhouette information obtained from the object image input by the step of inputting an image.

According to the present invention, there is also provided a three dimensional shape data recording method for recording three dimensional shape data of a three dimensional object, comprising the steps of generating three dimensional shape data of the three dimensional object; assigning a data reliability evaluation value to each of the three dimensional shape data; and recording three dimensional shape data to which the reliability evaluation value is assigned in a medium.

Further, there is provide a three dimensional shape data recording method for recording three dimensional shape data of a three dimensional object, comprising the steps of capturing three dimensional shape data of the three dimensional object; assigning a data reliability evaluation value to each of the three dimensional shape data; and recording three dimensional shape data to which the reliability evaluation value is assigned in a medium.

Still further, there is provided a medium having a program recorded therein for causing a computer to generate three dimensional shape data of a three dimensional object, the program comprising the steps of controlling pattern light projection section connected to the computer for projecting pattern light onto the three dimensional object; inputting an image of the three dimensional object; calculating a rough shape from the image; calculating a detailed shape from the image; and generating three dimensional shape data of the three dimensional object based on the rough shape and the detailed shape.

Moreover, there is provided a medium having a program recorded therein for causing a computer to generate three dimensional shape data of a three dimensional object, the program comprising the steps of controlling a pattern light projection section connected to the computer for projecting pattern light onto the three dimensional object; inputting an image of the three dimensional object; capturing a rough shape of the three dimensional object; calculating a detailed shape from the image; and generating three dimensional shape data of the three dimensional object based on the rough shape and the detailed shape.

Still further, there is provided a medium having a program recorded therein for causing a computer to generate three dimensional shape data of a three dimensional object, the program comprising the steps of: inputting an image of the three dimensional object, which is obtained by projecting pattern light onto the three dimensional object; calculating a rough shape from the image; calculating a detailed shape from the image; and generating three dimensional shape data of the three dimensional object based on the rough shape and the detailed shape.

There is also provided a medium having a program recorded therein for causing a computer to generate three dimensional shape data of a three dimensional object, the program comprising the steps of inputting an image of the three dimensional object, which is obtained by projecting pattern light onto the three dimensional object; capturing a rough shape of the three dimensional object; calculating a detailed shape from the image; and generating three dimensional shape data of the three dimensional object based on the rough shape and the detailed shape.

In the above medium, the step of generating three dimensional shape data may include determining the final three dimensional shape data based on the following rule; if the detailed shape exits inside the rough shape, then the detailed shape is the final three dimensional shape data of said object, otherwise the rough shape is taken as the final three dimensional shape data of said object.

Also, in the above medium, the step of generating three dimensional shape data may include obtaining a region where the object surface can exist based on the rough shape, to generate three dimensional shape data of the three dimensional object based on the rough shape, the detailed shape, and the region where the object surface can exist.

Preferably, in the above medium, the step of calculating a detailed shape may include obtaining a plurality of object surface location candidates from the input image.

Further, in the above medium, the step of calculating a detailed shape may include setting a region where the object surface cannot exist in a portion inside the rough shape and determining a region inside the rough shape other than the region where the object surface cannot exist as a region where the object surface can exist, to generate three dimensional shape data of the three dimensional object based on the rough shape, the detailed shape, and the region where the object surface can exist.

Further, preferably, in the above medium, the step of generating three dimensional shape data may include determining a final object surface location candidate from a plurality of object surface location candidates based on a region where the object surface can exist and generating three dimensional shape data of the three dimensional object based on the final object surface location candidate.

Still further, in the above medium, the rough shape may be calculated by the step of calculating a rough shape based on silhouette information obtained from the object image input by the step of inputting an image.

According to the present invention, there is also provided a medium having a program recorded therein for causing a computer to record three dimensional shape data of a three dimensional object in the medium, the program comprising the steps of generating three dimensional shape data of the three dimensional object; assigning a data reliability evaluation value to each of the three dimensional shape data; and recording three dimensional shape data to which the reliability evaluation value is assigned in the medium.

There is also provided a medium having a program recorded therein for causing a computer to record three dimensional shape data of a three dimensional object in the medium, the program comprising the steps of capturing three dimensional shape data of the three dimensional object; assigning a data reliability evaluation value to each of the three dimensional shape data; and recording three dimensional shape data to which the reliability evaluation value is assigned in the medium.

Also, there is provided a medium having three dimensional shape data of a three dimensional object recorded therein, the medium holding data reliability evaluation value information for each of the three dimensional shape data.

Still further, the present invention provides a three dimensional modeling apparatus for generating three dimensional shape data of a three dimensional object, comprising: projection means for projecting pattern light onto the three dimensional object; image input means for inputting an image of the three dimensional object; and three dimensional shape calculation means for calculating a three dimensional shape of the three dimensional object from the input image, wherein the three dimensional shape calculation means extracts a pattern projected region and a pattern border region in the input image to calculate the three dimensional shape of the three dimensional object based on these regions.

In the three dimensional modeling apparatus according to the present invention, the detailed shape calculation means may extract a pattern projected region and a pattern border region in the input image to calculate the detailed shape of the three dimensional object based on these regions.

In the above three dimensional modeling apparatus, preferably, the pattern light may have a plurality of binary patterns.

In the above three dimensional modeling apparatus, preferably, the image input means may perform image input from at least two positions.

Further, there is also provided a three dimensional modeling apparatus for generating three dimensional shape data of a three dimensional object, comprising projection means for projecting pattern light onto the three dimensional object; image input means for inputting an image of the three dimensional object; and three dimensional shape calculation means for calculating a three dimensional shape of the three dimensional object from the input image, wherein the image input means performs image input from at least two positions, the three dimensional shape calculation means extracts a portion in the input image where color or density changes, and matching of portions where color or density changes is performed between input images, to calculate the three dimensional shape of the three dimensional object.

In the three dimensional modeling apparatus according to the present invention, preferably, the image input means may perform image input where the images are captured at least two points at different locations, the detailed shape calculation means may extract a portion in the input image where color or density changes, and matching of portions where color or density changes may be performed between input images, to calculate the three dimensional shape of the three dimensional object.

In the above three dimensional modeling apparatus, preferably, the image input means may perform image input from at least two different points at different locations, the detailed shape calculation means may extract a portion in the input image where color or density changes, and matching of potions where color or density changes may be performed between input images, to calculate the three dimensional shape of the three dimensional object.

Preferably, in the above three dimensional modeling apparatus, the pattern light for projection may include multi-color patterns in which adjacent patterns have different colors having a hue difference of at least 90 degree or more, or a brightness difference of 0.3 or more, when the colors are represented in an HSV space.

In the above three dimensional modeling apparatus, the matching of the portions where color or density changes may be obtained based on properties of the portions where color or density changes, which are obtained from the input images.

Further in the above three dimensional modeling apparatus, the property of the portion where color or density changes may be color information regarding portions located to the left and right of, or above and below, the portion where color or density changes in the input image.

Still further, in the three dimensional modeling apparatus, averaging may be performed to the input images when the property is obtained.

Also, in the three dimensional modeling apparatus, the averaging may be performed for each of divided regions of the input image.

Preferably, the present invention provides a three dimensional modeling apparatus, further comprising moving means for moving the projection means and the image input means.

Preferably, the moving means may move the projection means and the image input means based on the rough shape.

According to the present invention, there is also provided a three dimensional modeling apparatus for generating three dimensional shape data of a three dimensional object, comprising: at least two three dimensional shape input means for obtaining a three dimensional shape of the three dimensional object; and moving means for moving the three dimensional shape input means, wherein the three dimensional shape input means have different three dimensional input accuracy.

In the three dimensional modeling apparatus, preferably, the moving means may move the three dimensional shape input means having higher three dimensional input accuracy based on three dimensional shape information obtained by the three dimensional shape input means having lower three dimensional input accuracy.

According to the present invention, there is also provided a three dimensional modeling method for generating three dimensional shape data of a three dimensional object, comprising the steps of projecting pattern light onto the three dimensional object; inputting an image of the three dimensional object; and calculating a three dimensional shape of the three dimensional object from the input image, wherein the step of calculating the three dimensional shape includes extracting a pattern projected region and a pattern border region in the input image to calculate the three dimensional shape of the three dimensional object based on these regions.

In the three dimensional modeling method according to the present invention, preferably, the step of calculating the detailed shape may include extracting a pattern projected region and a pattern border region in the input image to calculate the detailed shape of the three dimensional object based on these regions.

In the three dimensional modeling method, preferably, the pattern light may have a plurality of binary patterns.

Also, in the three dimensional modeling method, the step of inputting an image may include performing image input from at least two positions.

Still further, according to the present invention, there is provided a three dimensional modeling method for generating three dimensional shape data of a three dimensional object, comprising the steps of projecting pattern light onto the three dimensional object; inputting an image of the three dimensional object; and calculating a three dimensional shape of the three dimensional object from the input image, wherein the step of inputting an image includes performing image input where the images are captured at least two positions, the step of calculating the three dimensional shape includes extracting a portion in the input image where color or density changes, and matching portions where color or density changes between input images, to calculate the three dimensional shape of the three dimensional object.

In the three dimensional modeling method according to the present invention, preferably, the step of inputting an image may include performing image input from at least two points at different locations, the step of calculating a detailed shape includes extracting a portion in the input image where color or density change, and matching portions where color or density changes between input images, to calculate the three dimensional shape of the three dimensional object.

In the three dimensional modeling method according to the present invention, preferably, the pattern light for projection may include multi-color patterns in which adjacent patterns have different colors having a hue difference of at least 90 degree or more, or a brightness difference of 0.3 or more, when the colors are represented in an HSV space.

In the three dimensional modeling method, the matching of the portions where color or density changes may be obtained based on properties of the portions where color or density changes, which are obtained from the input image.

In the three dimensional modeling method, preferably, the property of the portion where color or density changes may be color information regarding portions located to the left and right of, or above and below, the portion where color or density changes in the input images.

Further, in the three dimensional modeling method, averaging may be performed for the input images when the property is obtained.

Still further, in the three dimensional modeling method, the averaging may be performed for each of divided regions of the input images.

According to the present invention, there is also provided a three dimensional modeling method for generating three dimensional shape data of a three dimensional object, comprising: at least two three-dimensional shape inputting steps of obtaining the three dimensional shape of the three dimensional object; and a step of moving a three dimensional shape input section, wherein the three dimensional shape inputting steps have different three dimensional input accuracy.

Further, there is also provide a three dimensional modeling apparatus for generating three dimensional shape data of a three dimensional object, comprising first three-dimensional shape measuring means for obtaining rough shape information of the three dimensional object; second three dimensional shape measuring means for obtaining detailed shape information of the three dimensional object; and a three dimensional shape data generating section for generating the three dimensional shape data of the three dimensional object based on the rough shape information and the detailed shape information.

According to the present invention, control means may be further provided for controlling the position of the second three dimensional shape measuring means, the control means being controlled based on the rough shape information obtained by the first three dimensional measuring means.

Further, there is also provided a three dimensional modeling method for generating three dimensional shape data of a three dimensional object, comprising: a first three dimensional shape measuring step of obtaining rough shape information of the three dimensional object; a second three dimensional shape measuring step of obtaining detailed shape information of the three dimensional object; and a three dimensional shape data generating step of generating the three dimensional shape data of the three dimensional object based on the rough shape information and the detailed shape information.

Further, the present invention provides a medium having a program recorded therein for causing a computer to generate three dimensional shape data of a three dimensional object, the program comprising a first three dimensional shape measuring step of obtaining rough shape information of the three dimensional object; a second three dimensional shape measuring step of obtaining detailed shape information of the three dimensional object; and a three dimensional shape data generating step of generating the three dimensional shape data of the three dimensional object based on the rough shape information and the detailed shape information.

DESCRIPTION OF PREFERRED EMBODIMENT

The preferred embodiments of the present invention will now be described.

In the following description and in the appended claims, the term "image" includes a wide variety of images from digitized image information (image data) that can be processed by a computer to images that are printed on a 35 mm film or on print paper.

(Description of the Structure)

Figure 1:
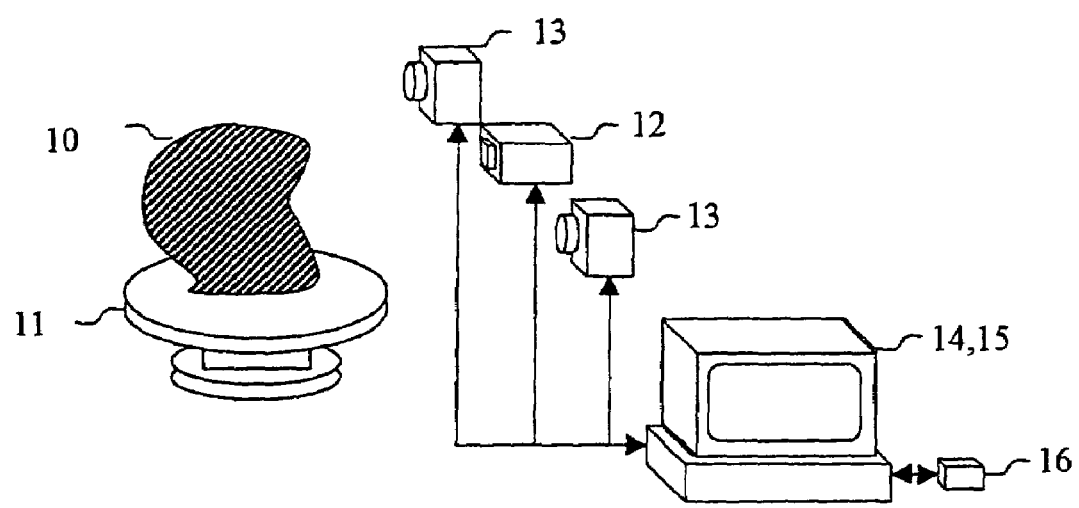
FIG. 1 is a structural diagram showing one embodiment of the present invention.

FIG. 1 conceptually shows a structure of the present invention. An input target 10 is placed on a rotational mount 11. A pattern projecting section 12 projects a pattern light onto the target 10. The target with the pattern projected is captured by a light receiving section 13.

The pattern projection and capturing are controlled by a controlling section 14. The captured image data is sent to a processing section 15. At the processing section, a three-dimensional shape calculation is performed, and the obtained three-dimensional shape data is stored in a recording section 16.

Generally, an analog camera or digital camera is used as the light receiving section 13, but a special-purpose camera which obtains a non-visible light image can also be used depending on the target. Also, in general, a calculation unit such as a personal computer or a workstation is used as the controlling section 14 and the processing section 15. Any recording medium can be used as the recording section 16 such as, for example, hard disk drive, CD-R, floppy disk, MO, and DVD, or the like.

Figure 2:
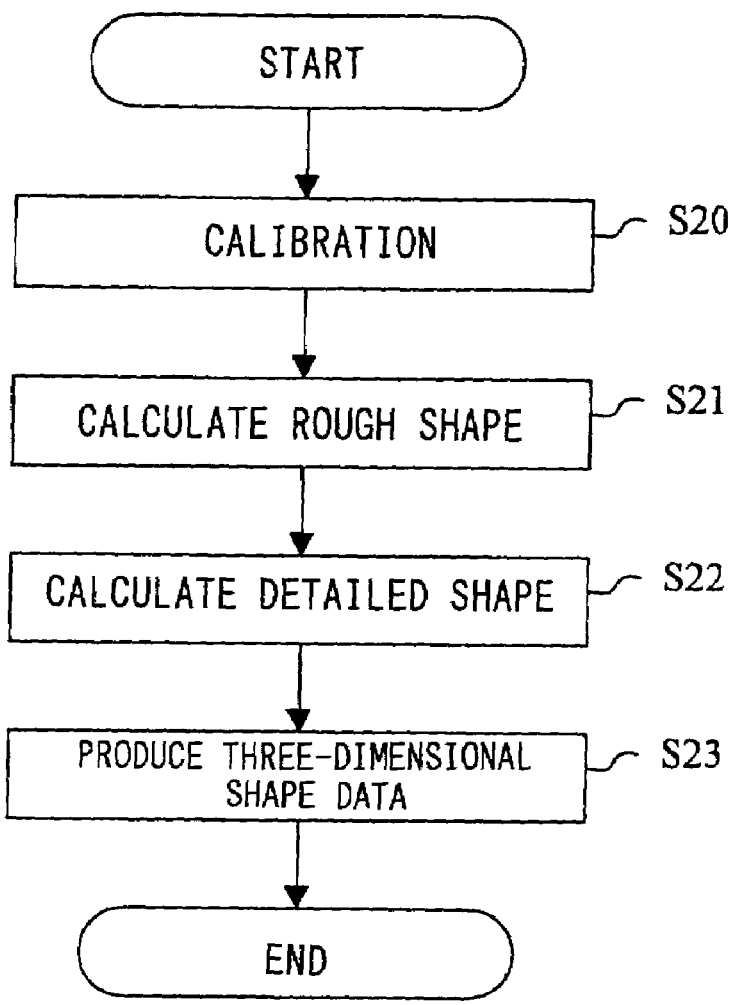
FIG. 2 is a flowchart showing one embodiment of the present invention.

FIG. 2 roughly shows a flow of the process according to the present invention. The process includes a total of four steps, including the steps of calibration, rough shape extraction, detailed shape extraction, and three-dimensional shape data production.

At the calibration step (S20), the internal parameters (for example, view angle information, that is, the ratio between the focal length and CCD size or lens distortion) and external parameters (camera positions) of the cameras are determined. At the rough shape extraction step (S21), rough shape information of the target is obtained. At the detailed shape extraction step (S22), on the other hand, detailed shape information of the target is obtained. At the three-dimensional shape data production step (S23), the rough and detailed shape information are integrated to produce final three-dimensional shape data.

An embodiment of the present invention will now be described in more detail.

It is assumed that the target 10 is placed on the rotational mount 11 and images of the target 10 are captured by a camera while the rotational mount 11 is rotated. It is also possible to place a plurality of cameras 13 around the target 10 and obtain a plurality of images of the target 10 from these cameras. The configuration with a plurality of cameras is preferable when the target 10 is an object which cannot be placed on the rotational mount 11 or an object which cannot remain stationary for a long period of time.

It is also assumed that the shape measurement is taken using the silhouette method at the rough shape extraction step and using an active stereo method by the space coding method using binary patterns at the detailed shape extraction step. Therefore, two cameras are used as the light receiving section 13.

The embodiment will be described following the flow shown in FIG. 2.

(Calibration Step)

At the calibration step, the internal and external parameters of the cameras 13 are determined. The internal parameters of a camera 13 include the view angle information (a ratio between the focal length and CCD size, which will be referred to as a "perspective ratio" hereinafter) and lens distortion parameter. The external parameters of the cameras 13 include the position and orientation information of the cameras 13, and more specifically, the positional relationship between the rotational axis of the rotational mount and the cameras 13, and the positional relationship between the cameras 13.

Figure 3:
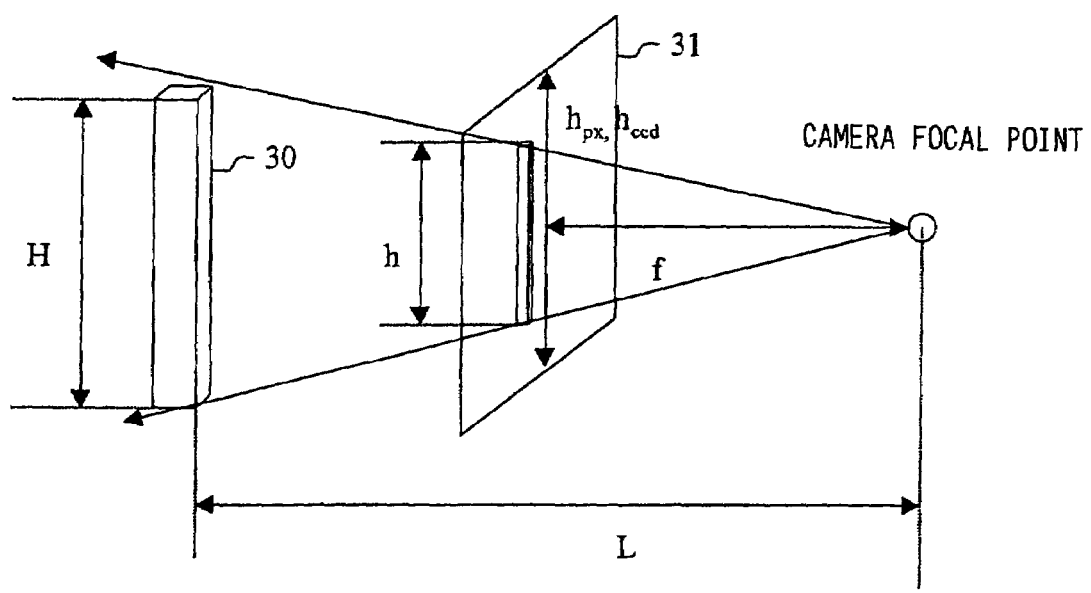
FIG. 3 is a diagram for explaining a perspective ratio.

FIG. 3 is a diagram for explaining the perspective ratio. A pinhole camera model is assumed as the camera model. The perspective ratio is defined as the ratio between the focal length and the CCD size (for example, the vertical length of CCD). In the case shown in FIG. 3, the perspective ratio would be $h_{ccd}/f$. This corresponds to the parameter for determining enlargement/reduction ratio when the size of the object projected onto the screen is enlarged/reduced in perspective depending on the distance from the viewpoint to the object.

In reality, it is more likely that the focal length of the camera 13 and the CCD size are unknown, or, even when these parameters are known, they may not be sufficiently accurate for use in actual shape measurement.

In such a case, the perspective ratio can be determined as follows. First, a reference pole 30 of length H is captured so that the image fits in an image surface 31. The distance L between the camera and the reference pole 30 is then measured. If the vertical size of the capturing surface is $h_{px}$ (in units of pixels) and the reference pole is captured with a length of h pixels in the capturing surface, the perspective ratio can be calculated by $(H \times h_{px})/(h \times L)$ using the relation $H/L = h/f$.

The method for determining the external parameter, that is, the positional relationship between the rotational axis of the rotational mount 11 and the camera 13 will now be described. This process will be referred to as "rotational mount calibration" hereinafter.

Figure 4:
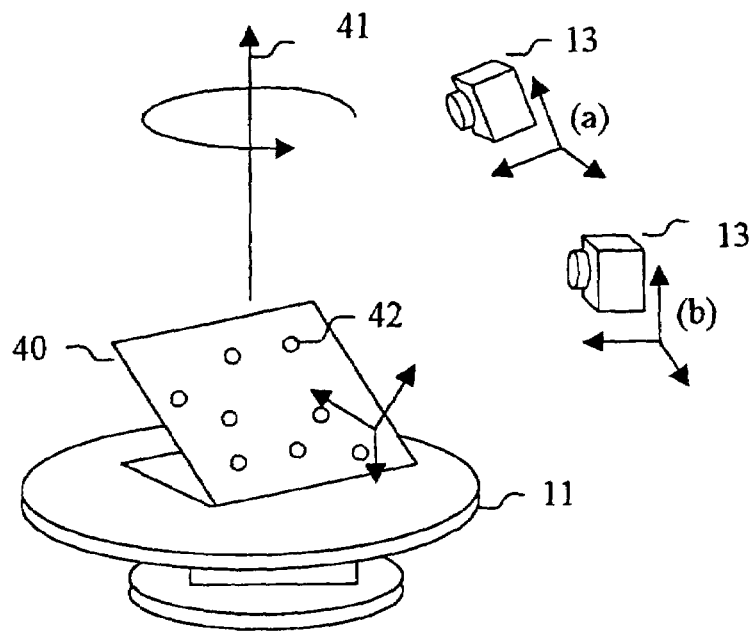
FIG. 4 is a diagram for explaining calibration (calculation of external parameters).

Referring to FIG. 4, in the rotational mount calibration process, an object 40 (referred to as a "reference object") with a know pattern printed is placed on the rotational mount 11. The known pattern is, for example, circle markings 42, and a plurality of such known patterns are printed on a flat reference object. All of the circle markings are printed at pre-specified locations, and the printed positions of the circle markings are pre-registered at the calculation unit for performing the rotational mount calibration process. The positional relationship between an object with a known pattern printed and the camera 13 can be reliably determined using Hough transform. The specifics of Hough transform will be described later.

In order to determine the positional relationship between the rotational axis 41 of the rotational mount 11 and the camera 13, it is not sufficient to only determine the positional relationship between the camera 13 and the reference object 40. To this end, the rotational mount 11 is rotated so that a plurality of images are taken for the reference object 40 from several points of view and the positional relationship between the camera 13 and the reference object 40 is determined for each viewpoint. Considering the fact that the camera viewpoint is fixed, this process corresponds to obtaining information on how the reference object 40 is moved with the rotational movement of the rotational mount 11. This movement forms a circular motion around the rotational axis 41 of the rotational mount 11, and thus, the movement of an arbitrary point on the reference object 40 (for example, its origin) is tracked and a circle is fitted to the trajectory. A line through the center of this circle which perpendicularly intersect the plane formed by the circle is the rotational axis 41 of the rotational mount 11.

Figure 5:
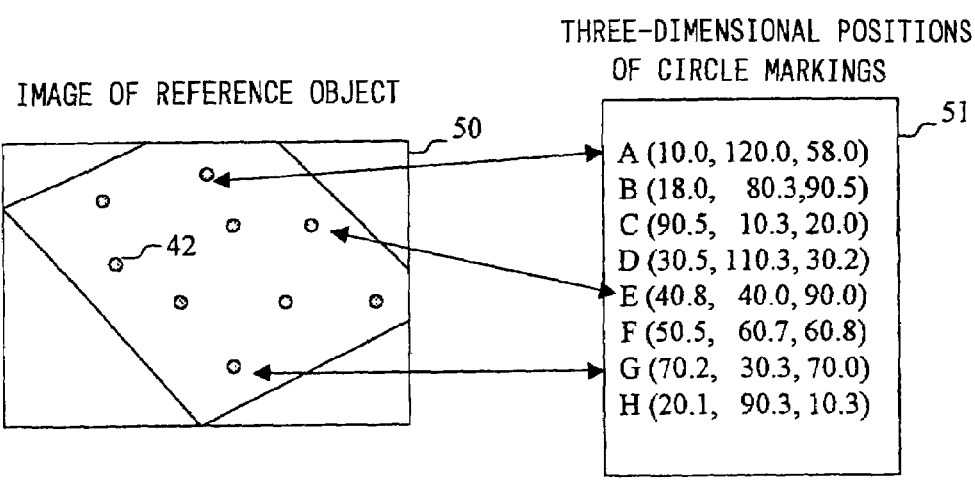
FIG. 5 is a diagram for explaining the principle of Hough transform.

The positional relationship determination method between the reference object 40 and the camera 13 using the Hough transform will now be described. Referring now to FIGS. 4 and 5, the reference object 40 is captured. The circle markings 42 are extracted from the captured image 50. A plurality of circle markings 42 are provided on the reference object 40 and thus, the circle markings cannot be distinguished from each other. Three circle markings are arbitrarily selected from among the extracted circle markings. Three circle markings data are also arbitrarily selected from the circle markings position data 51 registered at the calculation unit.

A conversion matrix from the reference object coordinate system to the camera coordinate system is then determined assuming these data are correct. The conversion matrix can be considered as the camera position and orientation seen in the reference object coordinate system, and can be determined by six degrees of freedom, camera positions X, Y, and Z and camera directions, $\alpha$, $\beta$, and $\gamma$. The following equation 1 shows the relationship between the camera coordinate system and the reference object coordinate system defined in terms of X, Y, Z, $\alpha$, $\beta$, and $\gamma$.

(Equation 1)

Obviously, the correctness of the values X, Y, Z, $\alpha$, $\beta$, and $\gamma$ are not ensured. However, when the values X, Y, Z, $\alpha$, $\beta$, and $\gamma$ are calculated for all combinations of arbitrarily selected three circle markings and three registered positional data, some of the combination will be correct, and yield accurate values for X, Y, Z, $\alpha$, $\beta$, and $\gamma$. All of the correct combinations will yield the same values for X, Y, Z, $\alpha$, $\beta$, and $\gamma$. The incorrect combinations, on the other hand, will yield random values for X, Y, Z, $\alpha$, $\beta$, and $\gamma$.

Figure 6:
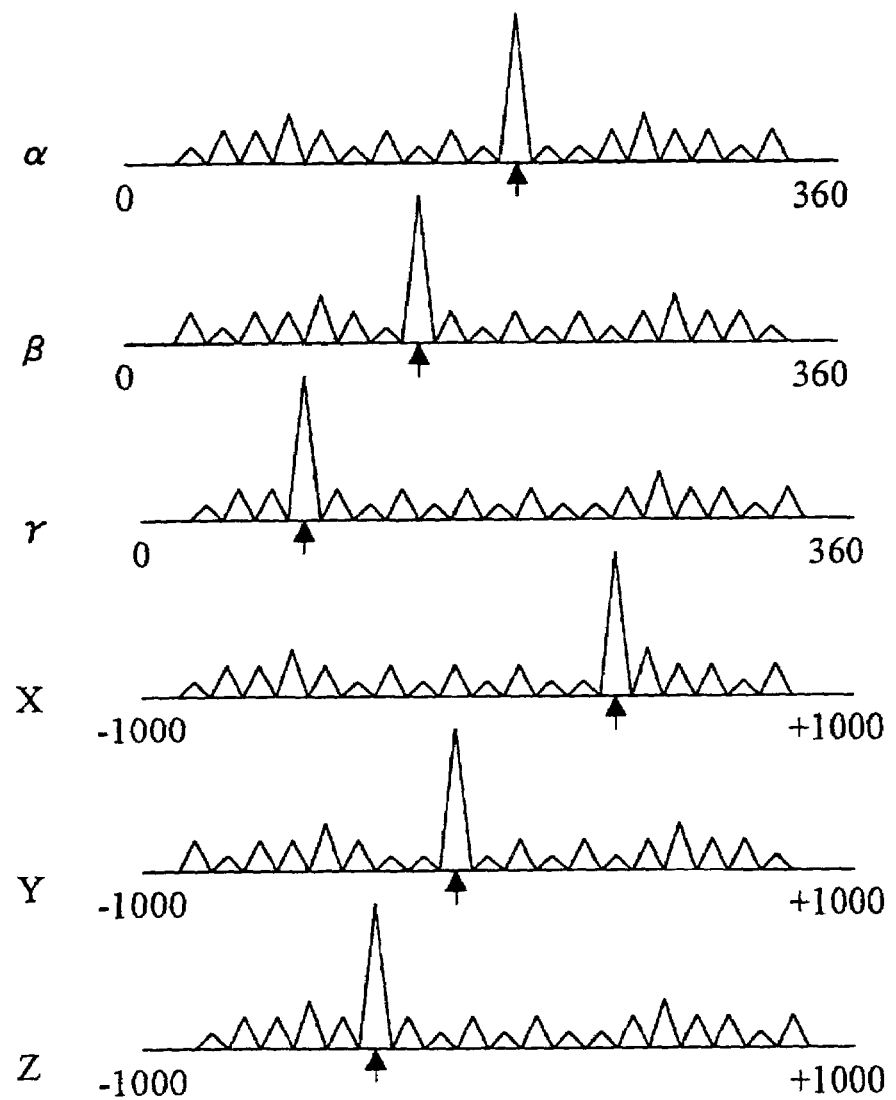
FIG. 6 is a diagram for explaining parameter determination in the Hough transform.

As shown in FIG. 6, graphs each corresponding to one of the variables for camera positions X, Y, Z, and camera directions $\alpha$, $\beta$, and $\gamma$ are prepared and all the values of X, Y, Z, $\alpha$, $\beta$, and $\gamma$ obtained for all the combinations are polled in the graphs. When the values X, Y, Z, $\alpha$, $\beta$, and $\gamma$ are calculated for all combinations of arbitrarily selected three circle markings and three registered positional data, some of the combinations will be correct, and yield accurate values for X. Y. Z, $\alpha$, $\beta$, and $\gamma$. The value that forms a peak in each graph is considered as the valid value. A point in FIG. 6 pointed by an arrow in the upward direction represents the valid value for that variable.

The positional relationship between the cameras 13 shown in FIG. 4, on the other hand, can be easily calculated from the conversion matrices between the reference object coordinate system and the camera coordinate systems when the same reference object 40 is captured by a plurality of cameras 13. Specifically, if the value of the three-dimensional point P, of camera a coordinate system, represented in the coordinate system of camera a is Pa, the value of the same three-dimensional point P represented in the coordinate system of camera b is Pb, and the value of P in the reference object coordinate system is Po, the relationship between these values will become:

$$P_a = R_{oa} * P_o + T_{oa}$$

$$P_b = R_{ob} * P_o + T_{ob}$$

Where $R_{oa}$, $R_{ob}$, $T_{oa}$, and $T_{ob}$ are respectively rotation and translation parameters from the reference object coordinate system into the coordinate system of camera a or camera b. The coordinate conversion between the cameras will be:

$$P_a = R_{oa} * R_{ob}^{(-1)} * P_b + (T_{oa} - R_{ob}^{(-1)} T_{ob})$$

Thus, the origin of camera b, for example, is at a position $(T_{oa} - R_{ob}^{(-1)} T_{ob})$ in the camera a coordinate system.

(Rough Shape Calculation Step by Silhouette Method)

Figure 7:
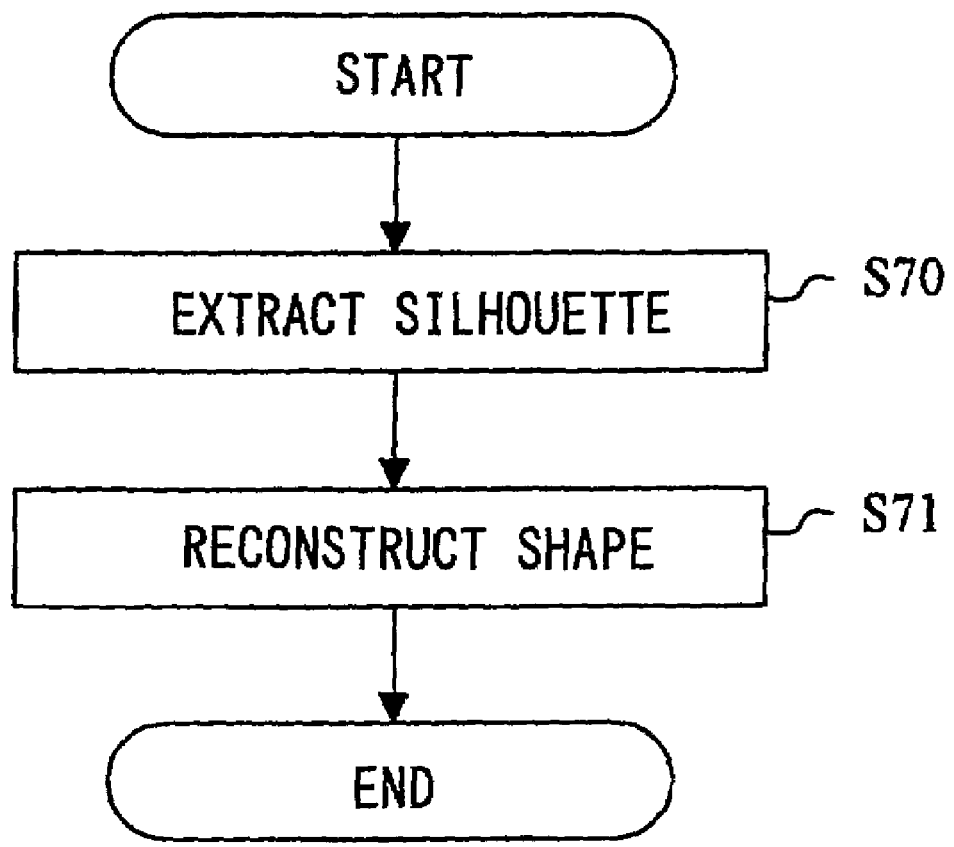
FIG. 7 is a flowchart for rough shape calculation by a silhouette method.

The rough shape extraction using the silhouette method will now be described. Referring to FIG. 7, a process for extracting silhouette of the target is performed on a plurality of object images input by the cameras (S70). For example, a chroma key method using blue back or background subtraction method where the background image data is pre-input and silhouette is obtained by difference processing the object image data and background image data can be used for silhouette extraction. The detailed description of the chroma key method and the background subtraction method will not be given here, but appears in, for example, Japanese Patent Laid-Open Publication No. Hei 11-96361.

At the next step, a shape reconstruction process is performed to reconstruct the three-dimensional shape of the target from the plurality of silhouette images (S71). In this step, the three-dimensional space where the target object is expected to exist is represented as voxel space. The voxel space is a space that represents the three-dimensional space by a group of tiny three-dimensional elements (voxels). The space where the target object exist can be expected to be is the region above the rotational mount and which can be fitted into the camera view.

Each voxel is then projected onto an individual silhouette image and only the voxels that are projected onto all the object silhouette images (or onto at least a predetermined number of silhouette images) are extracted as the rough shape of the object.

Figure 8:
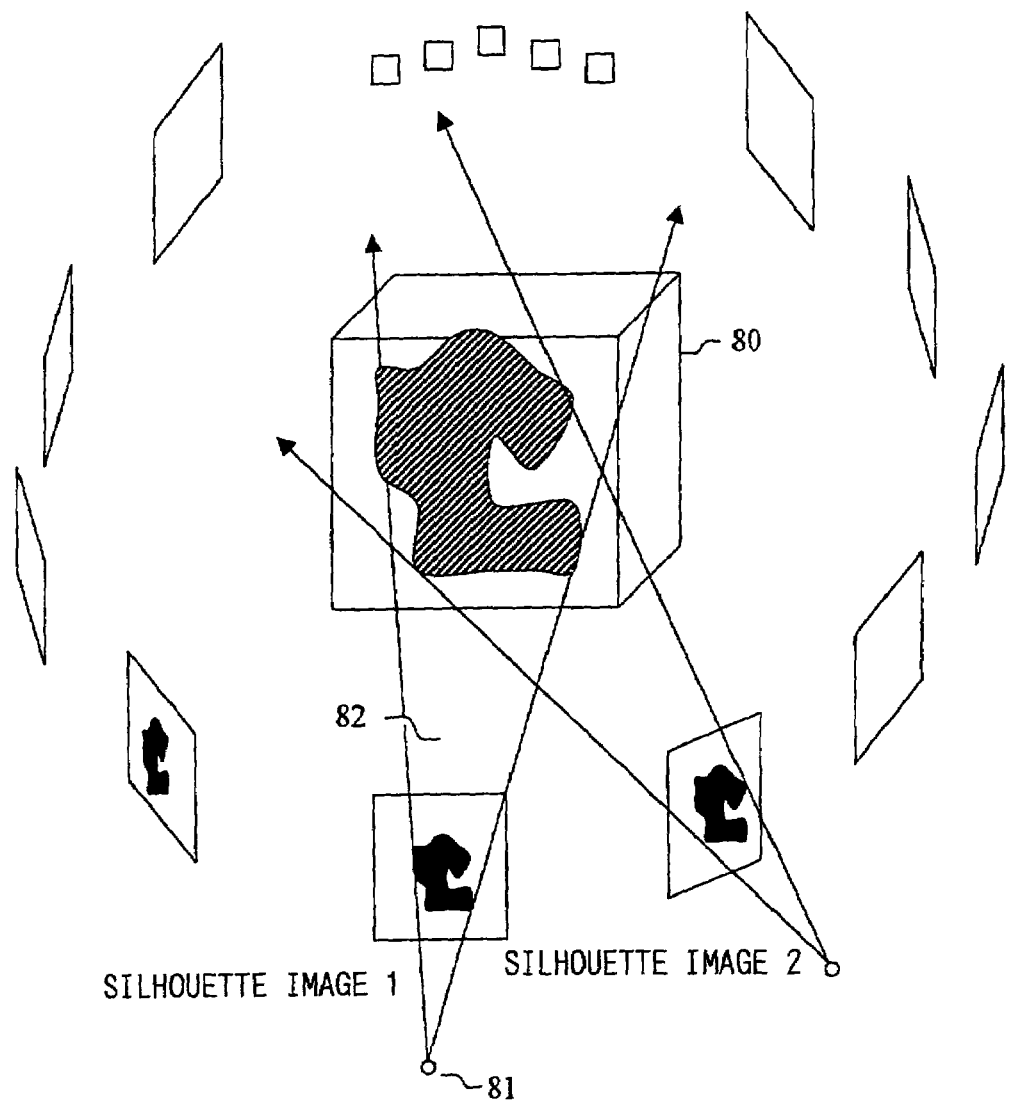
FIG. 8 is a diagram for explaining the shape reconstruction by the silhouette method.

FIG. 8 explains the shape reconstruction process as described above. In general, projection process to the voxel space 80 is performed based on multiple silhouette images, but the figure only shows a portion of the silhouette images.

At this point, a possible existence region is considered. The possible existence region for silhouette image 1 is the conical region 82 having the center of the camera viewpoint 81 as its vertex and the object image within the silhouette image 1 as its cross sectional shape. The possible existence regions for other silhouette images can be similarly defined. Thus, a target object will necessarily exist (unless there is an error in the silhouette images) inside the possible existence region. This process can be considered to correspond to an operation to cut the portions outside the silhouette from a gypsum block (a modeling material analogous to clay, styrofoam, etc.) and finally cut out the object.

The group of voxels extracted in this manner represents the three-dimensional shape of the object. However, detail of the object shape cannot be represented by the rough shape. For example, care must be taken in a portion which cannot be observed as a silhouette outline (for example, the inside of a cup), because the rough shape will be calculated in a condition with the portion filled in. One method for accurately calculating such a concave shape is a space coding method which will be described next.

(Detailed Shape Calculation Step Using Space Coding Method)

An active stereo method by space coding method using binary patterns will now be described. A binary pattern refers to a black-and-white pattern. One set of examples of coded binary patterns are shown in FIGS. 9(A) through 9(G). FIG. 9(A) shows a pattern having a black half and a white half. The pitch is sequentially halved for the patterns shown in FIGS. 9(B), 9(C), . . . 9(G). Such pattern lights are sequentially projected onto the target.

Figure 10:
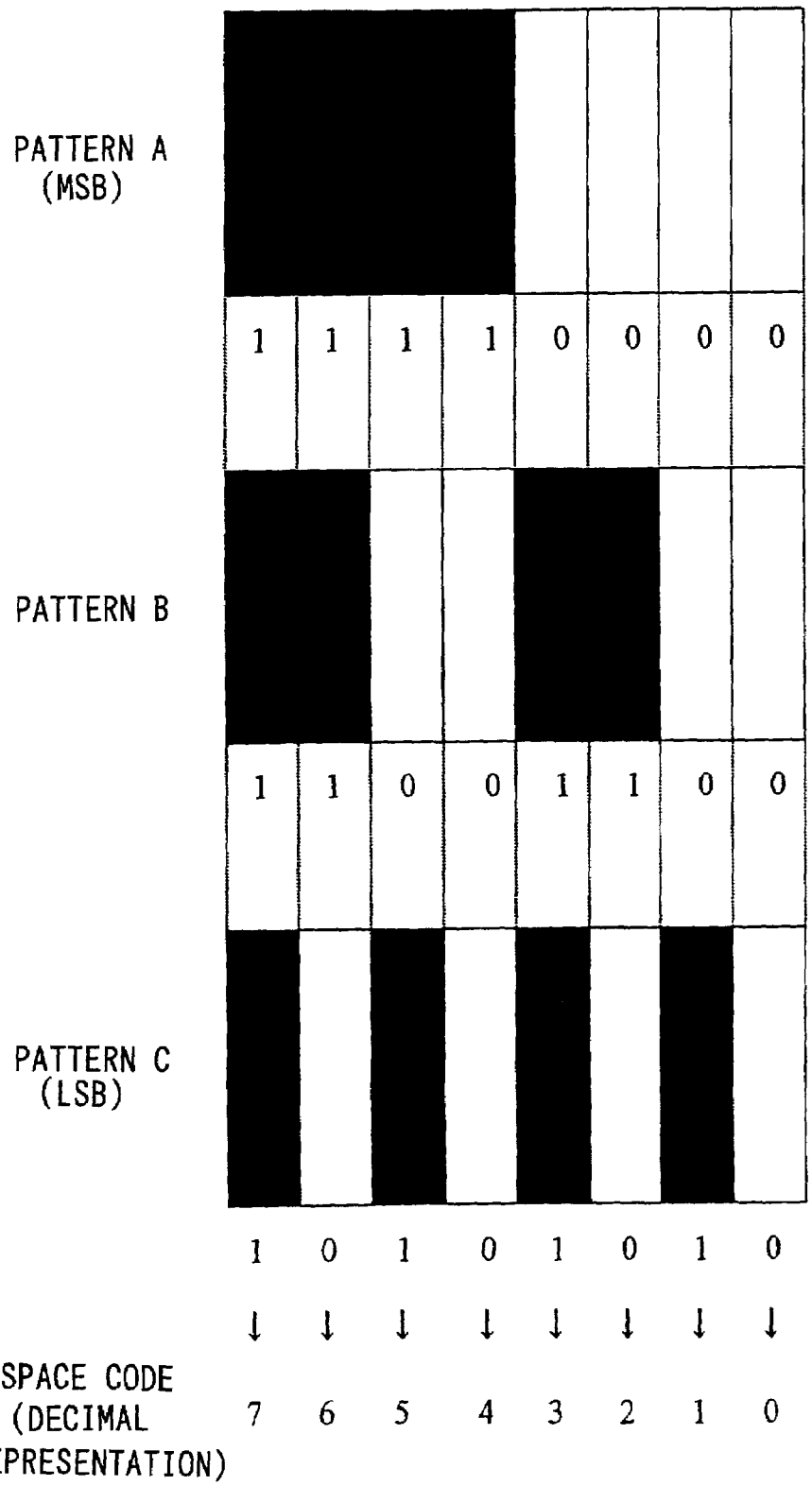
FIG. 10 is a diagram showing the principle of space coding method using the binary patterns.

FIG. 10 shows, for descriptive purpose, an example of a code when three types of pattern lights are sequentially projected. If each pattern is considered as 8-bit data, the dark portion of pattern A (shown as (A) in FIG. 10) is (1111) and the light portion of pattern A is (0000), and the overall pattern can be represented by 8 bits, (11110000). Similarly, pattern B (shown as (B) in FIG. 10) is (11001100) and pattern C (shown as (C) in FIG. 10) is (10101010).

Now, if pattern A is considered as an MSB (Most Significant Bit) and pattern C is considered as an LSB (Least Significant Bit), a 3-bit binary code can be assigned to each of the divided regions. For example, a number (000)=0 (in decimal) can be assigned to the right most region and a number (111)=7 (decimal) can be assigned to the left most region.

Figure 9:
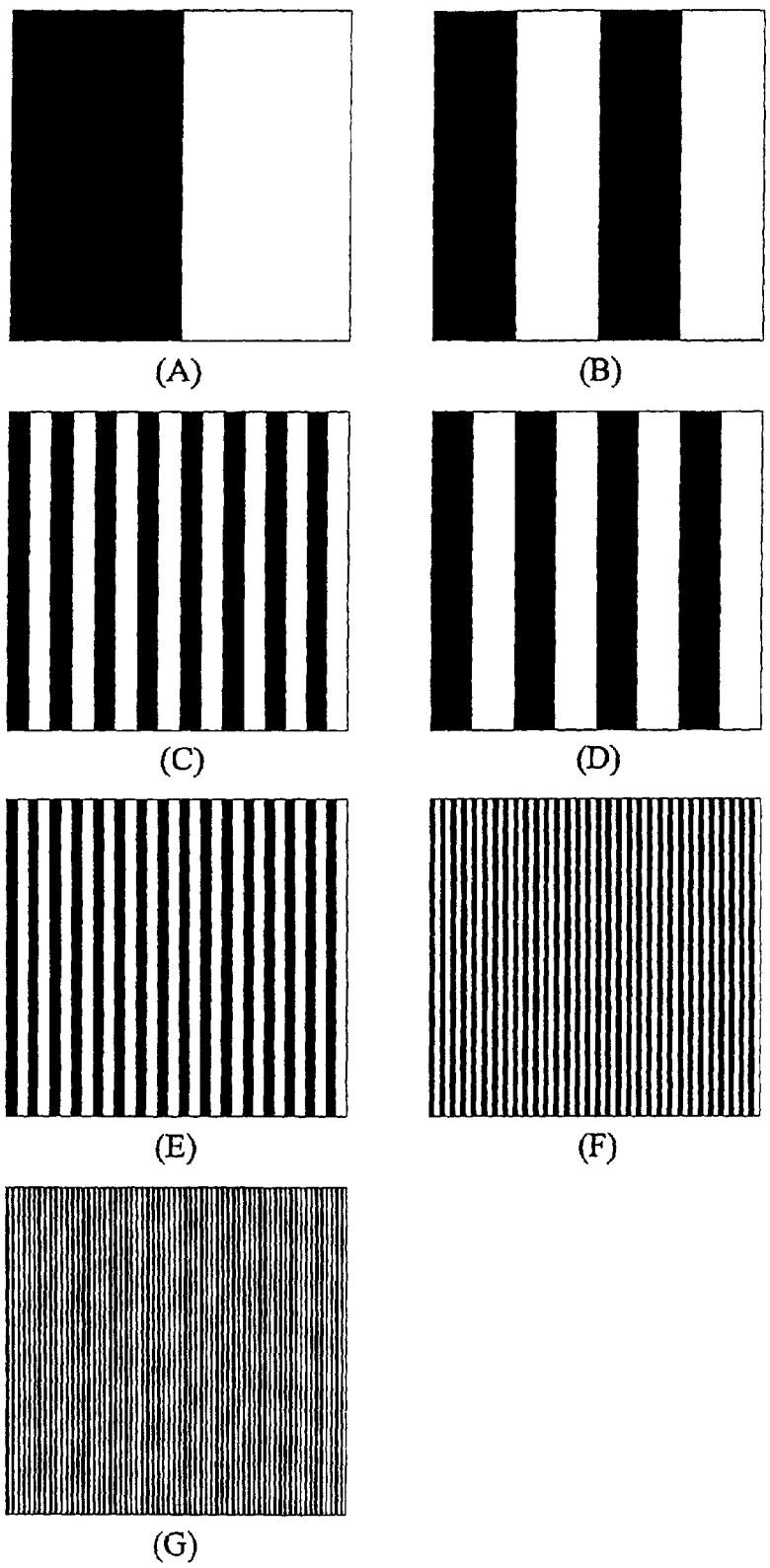
FIG. 9 shows an example of 7 types (A through G) of binary patterns.

By using n patterns as described, an n-bit binary code can be assigned to a space region, and thus, the space can be identified at once by this code. In FIG. 9, because a total of seven patterns are used, 128 space regions can be identified at once. When the space region of the point P where the object is located is specified by projecting such pattern lights onto the target, the space regions respectively projected onto the two camera images can be easily identified, and the correspondence relationship between the images can be easily obtained.

In other words, sections, for example, that are observed as 0010101 in time sequence in an image is unique for both camera images and they constitute correspondence points. Because the two camera positions are already determined at the calibration step, the three-dimensional position of each space region can be easily calculated by the principle of triangulation.

The detailed shape obtained in this manner becomes the depth data from the observation viewpoint, that is, the viewpoint of the light receiving section, and referred to as "detailed depth map" hereinafter. The detailed depth map is used for the three-dimensional shape data production at the next step. Details of the three-dimensional position measurement by space coding is described in, for example, "Three-dimensional image measurement" (by Masashi Iguchi and Hirosuke Sato, Shokodo).

(Three-dimensional Data Production Step)

The detailed shape is determined by the space coding method as described above, but, for a black portion where light is absorbed, there are some cases where no information can be obtained. In contrast, although detailed shape is not determined by the silhouette method, rough shape can be determined for the black portion where light is absorbed. Therefore, it is necessary to integrate the produced data to combine the advantages of the two methods. The integration process is performed at the three-dimensional shape data producing step.

At the three-dimensional shape data producing step, first, the rough shape represented by the voxels is converted into depth data from the camera viewpoint in the space coding method. This depth data is referred to as a "rough depth data" hereinafter. There also exist detailed depth map data obtained by the space coding method.

There is a possibility that a portion of the information is absent in the detailed depth map when a black portion which absorbs light is present in the target. In the rough depth map, on the other hand, there is a possibility that detailed concavity is not represented. Thus, the condition between each of the depth map information for each section can be divided into the following four cases:

1. the depth value of the rough and detailed depth maps are equal;
2. the depth value of the detailed depth map is larger than that of the rough depth map;
3. the depth value of the detailed depth map is smaller than that of the rough depth map; or
4. no value exists in the detailed depth map.

The first case corresponds to a section where the object shape is accurately measured by both silhouette and space coding methods. The second case corresponds to a section where the object shape is more accurately measured by the space coding method than by the silhouette method. The third case, on the other hand, corresponds to a case where an obviously erroneous value is output by the space coding method due to failure of black-and-white pattern extraction (specifically, determination that white pattern is projected even though a black pattern is projected or the like) in the space coding method.

This is because a true object surface always exists on or inside a surface determined by the silhouette method. The fourth case corresponds to a section where no shape data is obtained due to reasons such as the section being black.

Considering the above, a final depth map is obtained by integrating the two depth maps as follows.

For cases 1 and 2: Use the detailed depth map as the final depth map.

For cases 3 and 4: Use the rough depth map as the final depth map.

Figure 11:
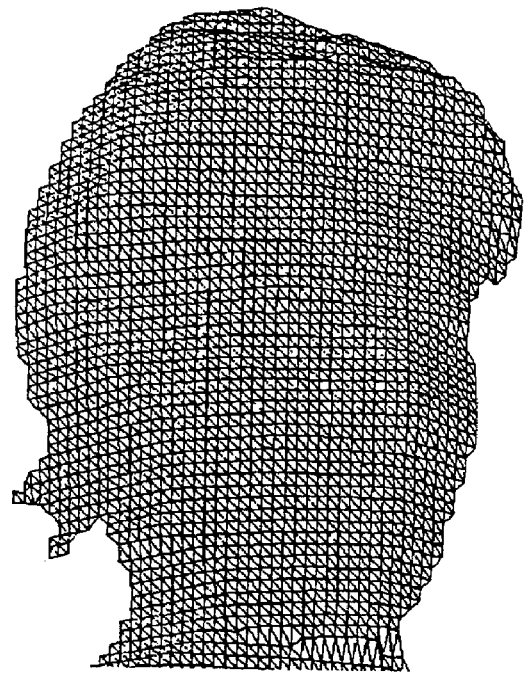
FIG. 11 is a diagram explaining the rough depth map, detailed depth map, and final depth map.
Figure 11:
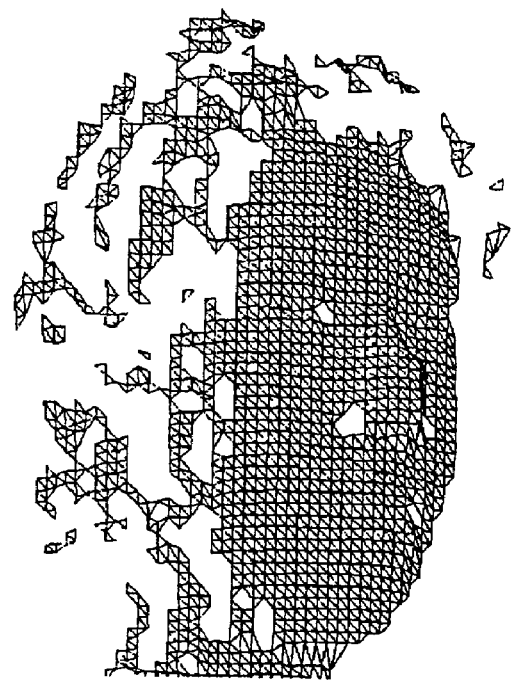
Figure 11:
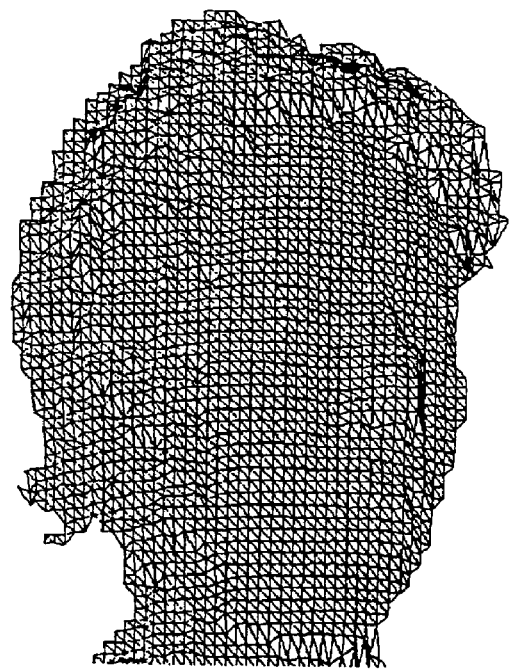

FIG. 11 shows a bird's eye view (wire frame display) of the rough and detailed depth maps and the final depth map obtained from these depth maps.

The final depth map is then applied on the rough data which is already obtained (and represented in the form of a voxel group). In other words, among the voxels that represent the rough data, the voxels that are not consistent with the final depth map, more specifically, the voxels with shorter distance than the distance from the light receiving section viewpoint indicated in the final depth map, are removed. After such removal, the object shape is represented by the remaining voxels.

The three-dimensional shape data is often used in various tools such as CG (Computer Graphics) and CAD (Computer Aided Design). During such processes, it is more typical to represent the three-dimensional shape data in a parametric surface such as polygon or NURBS, rather than by voxels. For this purpose, it is possible to extract voxels that correspond to the object surface from the group of voxels, and to convert the data into a polygon representation or into NURBS by connecting the surface voxels.

The following is a summary that repeats the effect of the method as described above.

1. In the silhouette method, three-dimensional shape information can be obtained irrespective of the color of the target, but concave shape portions cannot be accurately measured.
2. A triangulation method using a laser light and a space coding method for projecting a plurality of black-and-white patterns are available for accurately determining the shape of the concave portions, but in these methods, data cannot be obtained for black color portions and for mirror reflective sections.
3. By combining the rough shape extraction by the silhouette method and, for example, space coding, it is possible to obtain good three-dimensional shape measurements for both concave shapes and black and mirror reflective sections.

(Another Embodiment: Reduction in the Number of Patterns)

The above description described a method to realize a general-purpose three-dimensional shape modeling by suitable usage of the advantages for the silhouette and space coding methods. It is also possible to reduce the number of the projection patterns at the space coding method by employing the rough shape information by the silhouette method or the like. An embodiment using this advantage will now be described.

Figure 12:
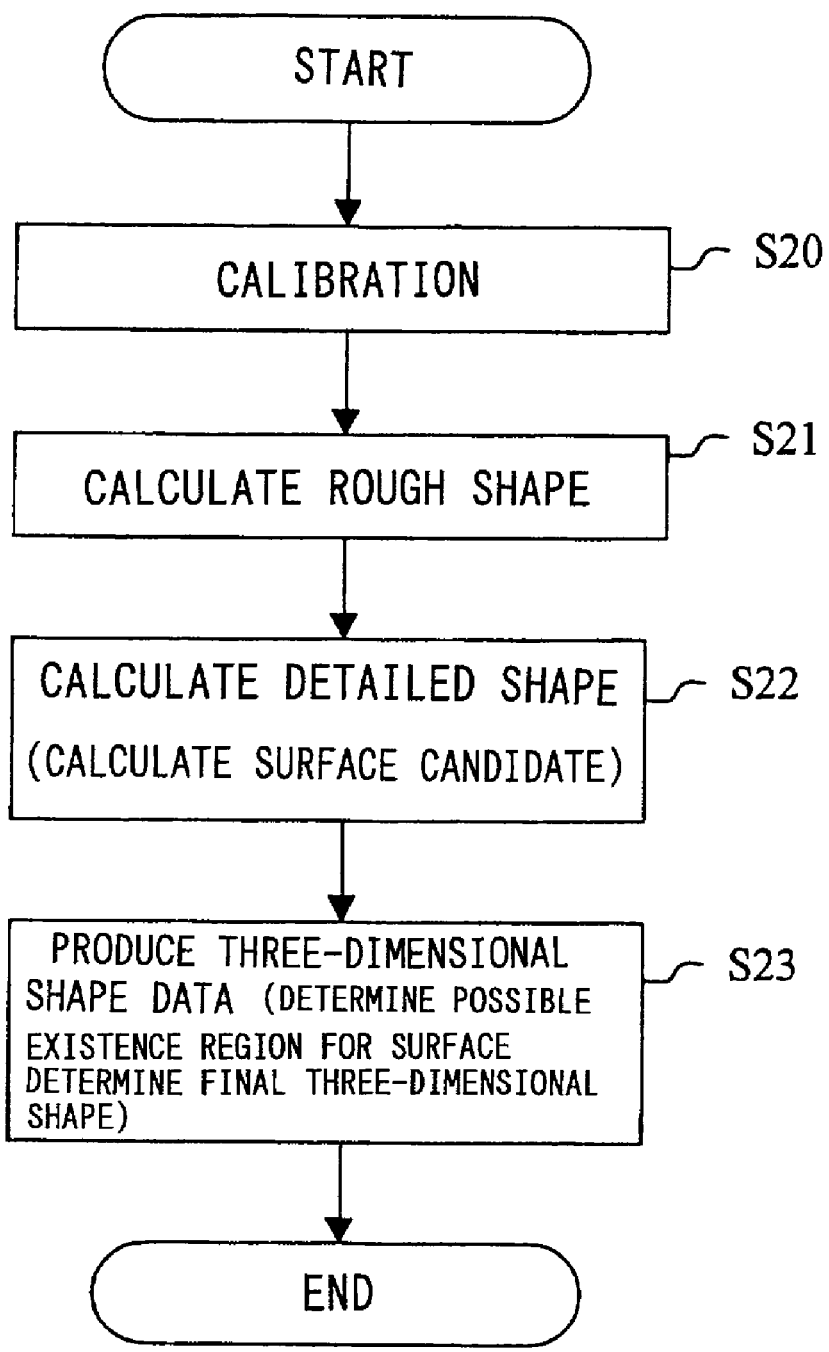
FIG. 12 is a flowchart for another embodiment of the present invention.

A conceptual structure in this embodiment is identical to that of the first embodiment and will not be described again. A rough flow is also identical to that of the first embodiment and includes four steps, a calibration step, a rough shape extraction step, a detailed shape calculation step, and a three-dimensional data producing step. In the detailed shape calculation step, however, target surface candidate extraction is performed. The three-dimensional data producing step includes two substeps, a step for determining the possible existence region for a surface and a step for determining the final three-dimensional shape. This is shown in FIG. 12. The calibration and rough shape extraction are already described, and will not be described again.

The process at the target surface candidate extraction step will now be described. Consider a case where only patterns shown in FIGS. 9(D), 9(E), 9(F), and 9(G) are used from among the patterns shown in FIG. 9. In this case, 3-bits worth of information is absent which would have been distinguished by patterns (A), (B), and (C), and in general, eight possible points are present which show the same black-and-white pattern sequence.

Figures 13, 14:
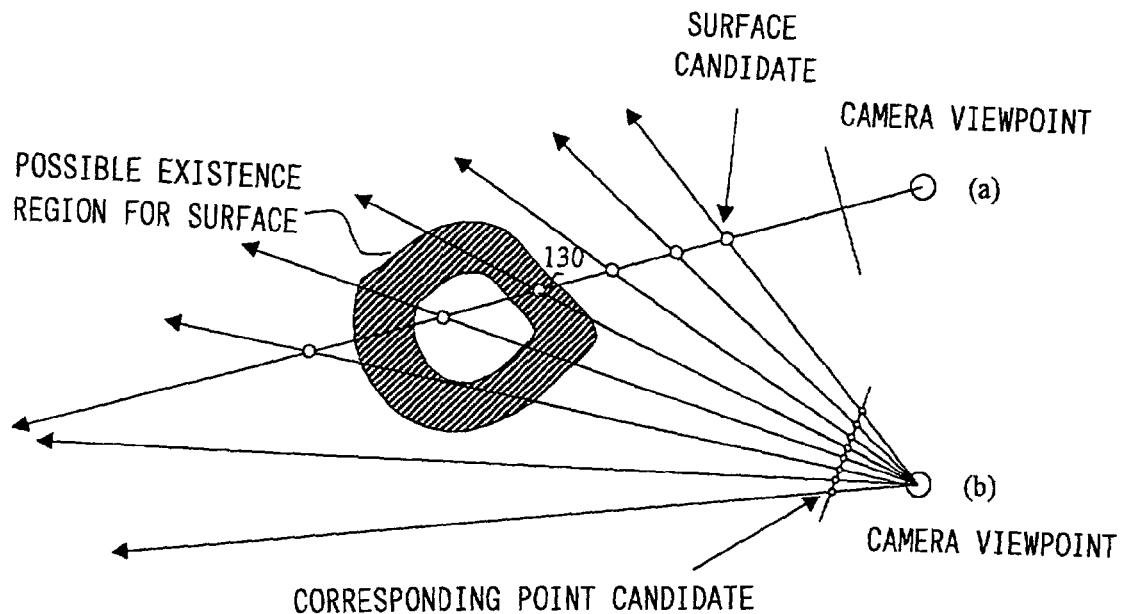
FIG. 13 is a diagram explaining the relationship between a plurality of surface candidates and possible existence region for a surface based on the rough shape.
FIG. 14 is an example of three-dimensional shape data with reliability information.
Figure 15:
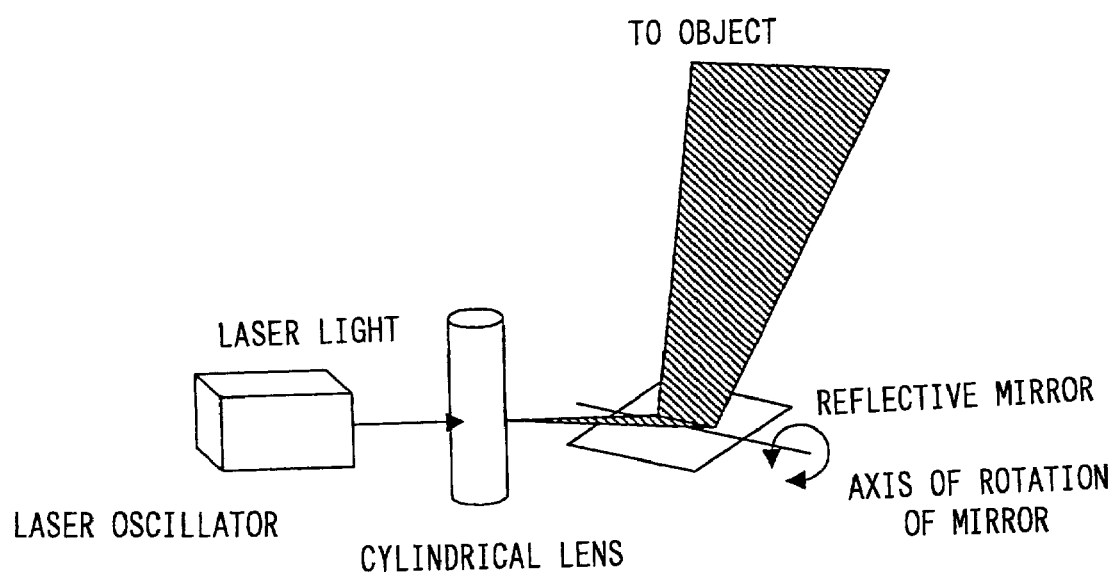
FIG. 15 is a diagram explaining the basic structures of a laser light irradiating section.

FIG. 13 shows the condition described above. Here, two cameras a and b are placed at the right and left, and vertical binary patterns are projected onto the target. The figure is a view seen from the top. Assume a code 0010 is assigned at a point on the screen of camera a. The points on the screen of camera b which have the same code 0010 are shown by circles, which are referred to as candidates for corresponding point. Eight such correspondence candidate points exist. The three-dimensional positions of these eight points are indicated by circles in the figure shown as a surface candidate. These eight points are therefore extracted as the object surface candidate.

The step for determining a possible existence region for a surface will now be described. The inside region of the rough shape can be considered to indicate a region where the surface of the object can exist. This is because no surface of the object can exist outside the rough shape. In addition, when some characteristics of the target are known, a further limitation can be applied to the possible existence region for a surface. For example, when a human face is input, there are certain limitations on the asperity of the surface.

Thus, it is possible to apply a rule, such as, for example, "no true surface exists 3 cm inside of the rough shape surface". Such a rule is not only applicable to a human face but also to a general shape when some characteristics of the target object are known. Therefore, at the step for determining a possible existence region for a surface, a region where the surface of the object can exist is determined based on the rough shape information and some characteristics of the target object.

At the final three-dimensional shape extraction step, only the obtained object surface candidates that exist within the possible existence region for the surface are extracted. In the case shown in FIG. 13, for example, although eight object surface candidates are originally present, the distance between the candidates are large. If the determined possible existence region for a surface is the portion indicated by the cross-hatched region, the only candidate among the eight candidates that fits in the possible existence region for a surface is the candidate indicated by the reference numeral 130. Thus, the circle shown by the reference numeral 130 is extracted as the final three-dimensional shape.

In this manner, by using the rough shape information, the number of patterns at the space coding method can be reduced. This is especially useful in reducing the length of the time for inputting data. When a triangulation method using laser light irradiation is used in place of the space coding method, noise related to the target object surface data (section of the surface shape data that is erroneously measured as extremely protruding from or lowered compared to the surface) which is often referred to as a spike can be easily removed.

(Data Recording)

The data production has been described. When new three-dimensional data is produced by integrating three-dimensional data obtained by different devices or methods having different reliability or precision, the data will have different precision or reliability depending on the section.

For example, the section where the rough shape data is taken as the final data can be considered as having lower reliability than the section where the detailed shape data is used as the final data. It is therefore preferable to record the data with the reliability evaluation value for each section of the three-dimensional data.

An example of reliability data is shown in FIG. 14 where the three-dimensional data is to be represented based on polygons. As shown in FIG. 14, the three-dimensional data can be divided into a vertex coordinate data section and the polygon data section where the polygons are constructed by connecting the vertices. For example, the data indicates that the 0th vertex (vid 0) is located at (x, y, z)=(0.0, 20.0, 43.0), the first vertex is located at (10.3, 5.2, 133.8), and the second vertex is located at (−20.9, 3.2, 13.9), and the 0th polygon (pid 0) is constructed by connecting the 0th, first, and second vertices. The reliability (for example, defined to have higher values for higher reliability) is defined for each vertex, for example r=1.0 is defined for the 0th vertex and r=0.5 for the first vertex.

In this manner, by recording the reliability data along with the three-dimensional shape data, it is possible to proceed with the integration process while weighting the data based on the reliability to integrate the produced three-dimensional shape data and three-dimensional shape data of the same target but obtained by different method or device.

When the three-dimensional shape data is applied in various applications, the portion that can be used can be selectively extracted based on the reliability. For example, when the shape is to be viewed on the Internet, the precision of the shape is not as important, and the three-dimensional shape data can be shown including the data with low reliability.

When the same data is input to a CAD tool, on the other hand, the precision of the shape is important, and only the data with high reliability is input. The other data can be interpolated and produced by a manual modeling function provided in the CAD tool.

Moreover, when the three-dimensional data is to be manually corrected and processed, it is generally true that the maneuverability improves if the points to be corrected are automatically told to an operator. In this case, if the reliability information is added to the three-dimensional data, the correction points can be told based on this information.

The above description of the data recording assumes that the reliability is evaluated in a numerical value. However, the evaluation of the reliability is not limited to a numerical value. There can be another method, for example, where the reliability is divided into several levels, and a symbol is assigned to each of the levels. In case where the data recording method is a data recording method integrating a plurality of media, a method can be used where the reliability is represented visually or by audio.

(Miscellaneous)

In the above description, the rough shape is determined by the silhouette method, but the rough shape can be obtained by other methods. When the choice of a target is narrowed to some extent in advance, it is also preferable to give the rough shape by manually supply or by supply from database or the like.

Also, in the above description, an active stereo method using a binary coded light is used as the method for the detailed shape extraction. The detailed shape extraction can also be performed by a triangulation method using color coding light or a laser light, or by a Moire method. The "pattern light" in the present invention includes the projection lights used in these methods. If the positional relationship between the pattern projecting section and the camera is accurately known in advance, the number of cameras to be used can be one.

It is also described that it is possible to reduce the number of projection patterns in the space coding method using the rough shape information. Similarly, in the triangulation method using a laser light, it is possible to irradiate a plurality of laser lights, obtain a plurality of candidates for depth data, and then narrow the candidates using the rough shape information. In such a case, the data input can be accelerated compared to a case where only a single laser light is used.

In addition, in the above, the rough shape obtained by the silhouette method is represented as a group of voxels. However, it is also possible to reconstruct the shape by an envelope line, as described in "Shape Measurement and Description of Curved Surface Objects", Sato et al., Electrical Communication Institute Paper, Vol. J-62-D, No. 1(1979). It is also possible to represent the reconstructed shape by a parametric surface such as polygons or NURBS.

(Binary Pattern Projection which does not Require Position Coincidence)

A space coding method using general binary patterns is described above.

When binary patterns as shown in FIG. 9 or 10 are used, the following problem is observed. In general, there is a need to separate the input image with the binary pattern projected onto the target into a portion corresponding to the white pattern (white pattern region) and a portion corresponding to the black pattern (black pattern region). The boundary between the white pattern and black pattern is unstable in that it may be assigned to either the white pattern region or the black pattern region.

Figure 16:
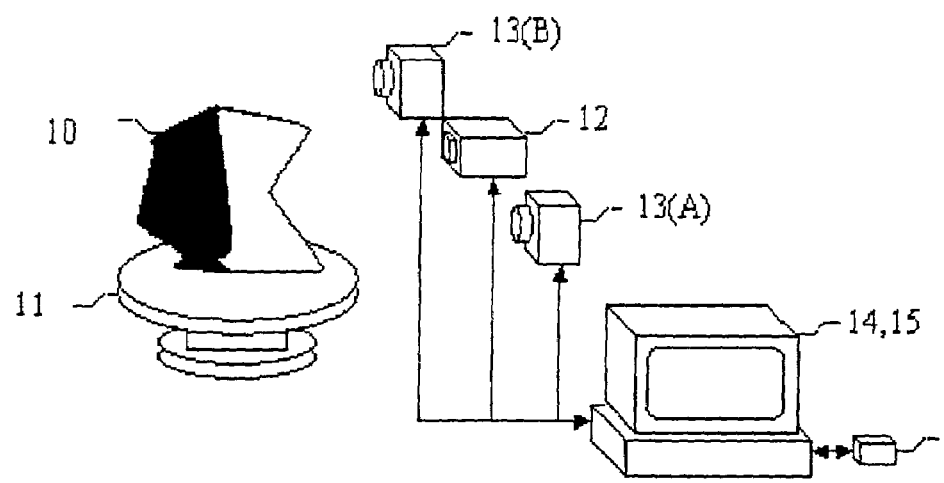
FIG. 16 is a diagram showing an example of inputting pattern projected images by two cameras.
Figure 17:
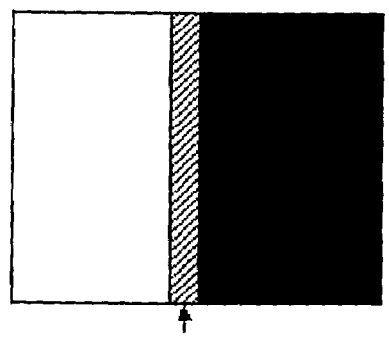
FIG. 17 is a diagram explaining an example of a code assignment error in the binary pattern.
Figure 17:
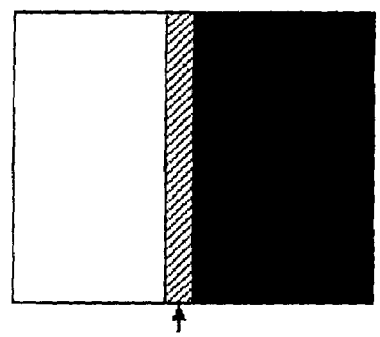
Figure 17:
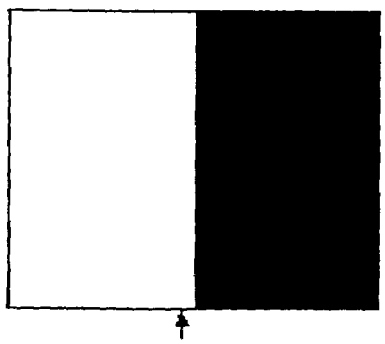
Figure 17:
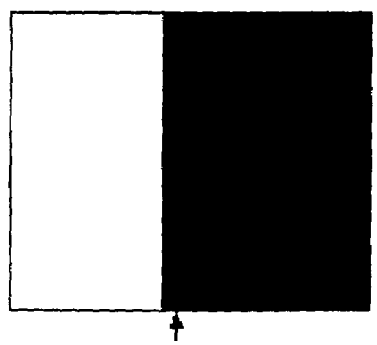

FIG. 16 shows a condition where binary patterns are projected from the pattern projecting section 12 onto the input target 10 and images are input by two cameras 13A and B. FIG. 17 shows an enlarged view near the boundary between the white and black pattern sections in the image input by camera A.

FIG. 17(a1) shows a portion of the image input by camera A. FIG. 17(b1) shows a portion of the image input by camera B. In both cases, the boundary between the black and white patterns indicated by an arrow pointing upward has an intermediate lightness. In such a case, it is indecisive as to which of the two codes are finally assigned to the portion indicated by the up-pointing arrow, a code corresponding to the black pattern or a code corresponding to the white pattern.

FIG. 17(a2) shows a case where the portion in an image input by camera A indicated by the up-pointing arrow is assigned a code corresponding to the white pattern and FIG. 17(b2) shows a case where the portion in an image input by camera B indicated by the up-pointing arrow is assigned a code corresponding to the black pattern. In this case, although the same code should be assigned to the corresponding portions indicated by the up-pointing arrows, in reality, different codes are assigned, resulting in an error in the correspondence relationship.

Figure 18:
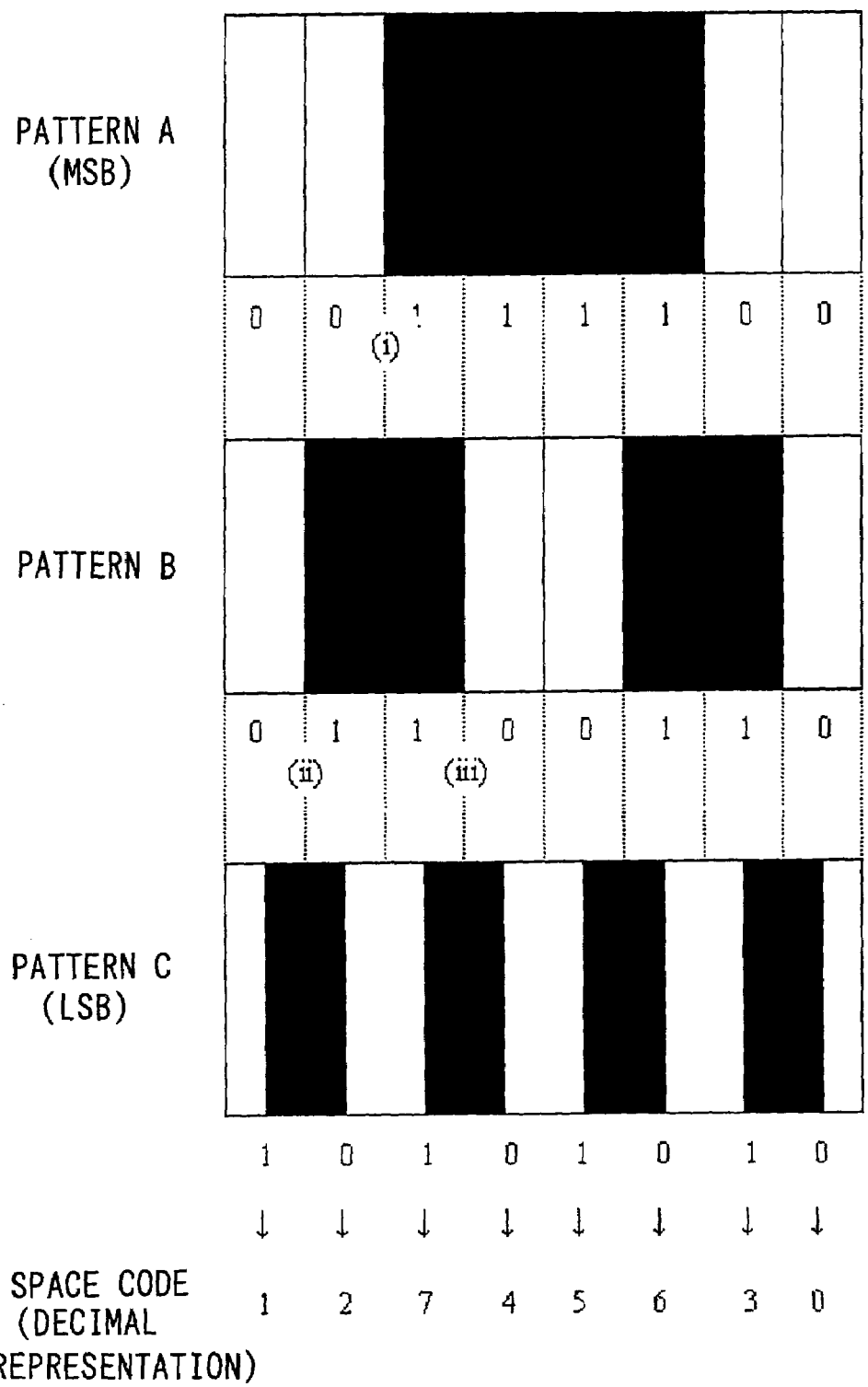
FIG. 18 is a diagram showing another example of binary patterns.

In order to avoid such a problem, there is a method, as shown in FIG. 18, in which the boundary i between the white and black in pattern A is provided at a point corresponding to the midpoint between the boundaries ii and iii between the white and black in pattern B. A similar positional relationship applies between the patterns B and C. For the most detailed pattern, the code assignment is assigned to the pattern boundary. That is, the boundary having white at the left and black at the right is assigned a code of 1 and the boundary with black at the left and white at the right is assigned a code of 0.

However, in this case, the pattern position must be accurately set. If the setting is not accurate, it is possible that, for example, pattern A will slide to the right, resulting in the boundaries i and ii coinciding, and thus, the same problem is generated as described above.

However, in order to accurately set the pattern positions, an expensive pattern projecting mechanism will be required. When there is no need to accurately set the pattern positions, on the other hand, an inexpensive pattern projecting mechanism such as a slide projector can be used. In order to avoid the above described problem without accurately setting the pattern positions, it is preferable to employ the following method.

Figure 19:
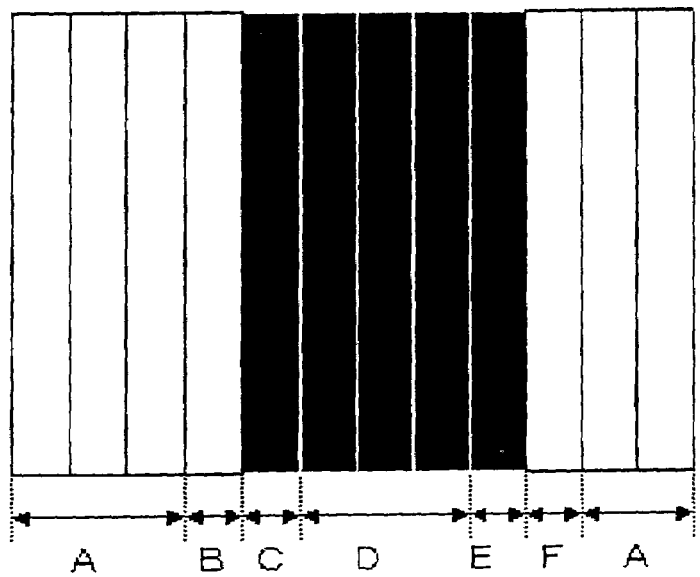
FIG. 19 is a diagram explaining assignment of six types of coding regions.

The method classifies the input image with the binary patterns projected onto the target into six types of regions as shown in FIG. 19, rather than into only two, the portion corresponding to the white pattern (white pattern region) and the portion corresponding to the black pattern (black pattern region). Specifically, the six types include:

A: white pattern region;
B: white region at the transition region from the white pattern to the black pattern;
C: black region at the transition region from the white pattern to the black pattern;
D: black pattern region;
E: black region at the transition region from the black pattern to the white pattern; and
F: white region at the transition region from the black pattern to the white pattern.

A correspondence relationship is then obtained after such separation into regions (code assignment).

Here, the following correspondence relationships are taken to be true in order to consider errors in region assignment.

A <-> F, A, B
B <-> A, B, C
C <-> B, C, D
D <-> C, D, E
E <-> D, E, F
F <-> E, F, A

In this manner, by increasing the number of assigned codes from two and introducing an allowance range for the correspondence relationship, the correspondence relationship can be stably obtained even when there are some unstable elements during the region separation.

(Color Code Pattern Projection)

A space coding method using a color pattern will be described now. In the above space coding method using binary patterns, a plurality of patterns need to be projected. Alternatively, by employing a color pattern, the number of patterns to be projected can be reduced.

Figure 20:
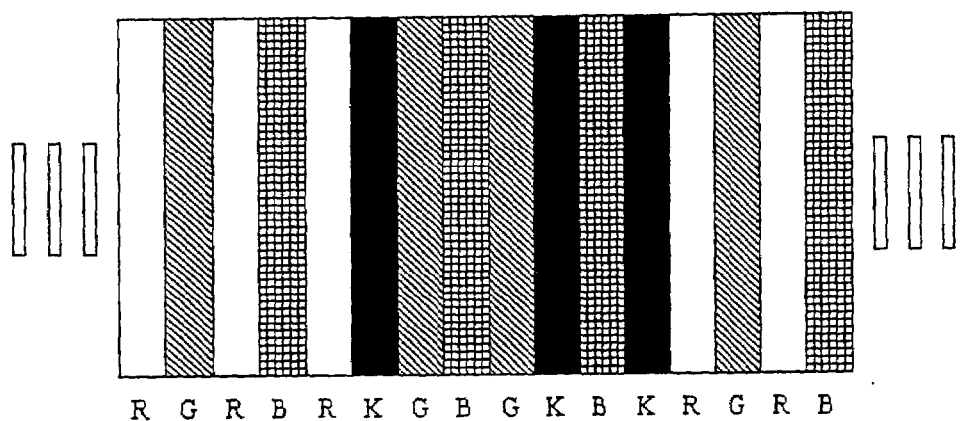
FIG. 20 is a diagram showing an example of a color code pattern.

FIG. 20 shows an example of a color pattern. It is preferable to have the colors between the adjacent patterns be as different as possible. It is also preferable that the colors, when represented in HSV space, have at least 90 degrees difference in hue, or at least 0.3 difference in lightness. In the case shown in FIG. 20, the pattern is constructed using four colors, red, green, blue, and black. It is also possible to use other combinations or other colors with sufficient differences in hue and lightness.

The distance from the viewpoint where each image is captured to the target is calculated for an image of an object projected with such a pattern by the following processes.

1. Extract Characteristic Points from the Image

Edge extraction is performed on the image and a thinning operation is applied. Thinned edges having a value of at least a predetermined value are considered as characteristic points.

2. Assign a Property to Each Characteristic Point

The color information at the left and at the right of the characteristic point is assigned as a property. In order to stabilize the property assignment, it is preferable to average the color data within a region between right and left characteristic points. Also, it is possible to average the color data within a region after region division is applied to the image.

3. Associate characteristic points between images from a plurality of viewpoints based on the property.

Association between characteristic points extracted from individual images is performed based on the property.

Here, it is assumed that the correspondence is more probable for characteristic points having similar property. The similarity is calculated by representing the property by RGB and using an equation:

$$|Rla-Rlb|+|Gla-Glb|+|Bla-Blb|+|Rra-Rrb|+|Gra-Grb|+|Bra-Brb|$$

Here, Rla means the value of the R component related to the color at the left of the characteristic point in the image from camera viewpoint a, and |Rla−Rlb| means the absolute value of the difference between Rla and Rlb. Alternatively, it is also possible to similarly evaluate the similarity using HSV or other color spaces.

In process 3, it is also preferable to use a multocular stereo method of trinocular or more in place of a binocular stereo method where characteristic points in two images having the most similar properties are associated. The multocular stereo method is more reliable in associating the characteristic points.

For example, in a trinocular stereo method, in addition to extracting a plurality of characteristic points that are similar in the property between two images (AB pair) corresponding to camera viewpoints A and B, a plurality of characteristic points are also extracted for two images corresponding to camera viewpoints B and C (BC pair) which have similar property. For each corresponding characteristic point candidate, a depth value from the camera viewpoint B is determined. If the corresponding characteristic point candidate is, in fact, the corresponding characteristic point, the depth value determined from the AB pair and the depth value determined from the BC pair should coincide (or be within an error limit).

Figure 21:
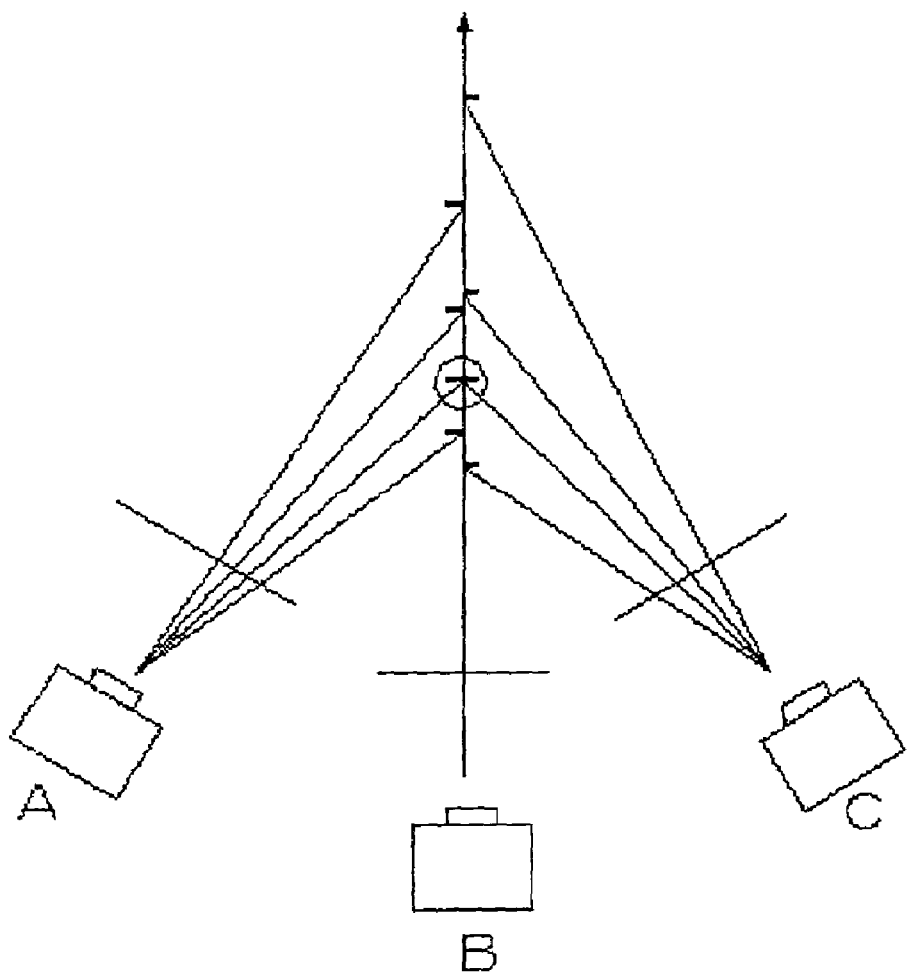
FIG. 21 is a diagram showing, as a model, the depth value of the corresponding characteristic point candidate obtained using three cameras, A, B, and C.

Therefore, the depths for extracted candidate characteristic points are compared, and the candidate with the smallest difference is assumed to be the true corresponding point. In this manner, the correspondence of the characteristic points can be reliably determined. FIG. 21 shows the depth value for correspondence characteristic point candidates using three cameras, A, B, and C. In this case, the pair indicated by a circle will be ultimately judged to be the true corresponding characteristic point.

In the above description, the stereo camera positions are assumed in the horizontal direction (right and left). Accordingly, the patterns are assumed to be vertical stripes. When the stereo cameras are positioned vertically (above and below), it is preferable to use horizontal stripe patterns.

Usage of 3D Sensors with Different Precision

In addition, it is also preferable to use a plurality of three-dimensional shape inputting means, for example, laser scanner heads, each with different input precision in the three-dimensional shape inputting apparatus.

In general, a laser scanner head with high input precision has smaller measurement range than a laser scanner head with lower input precision. Using this general fact, the rough shape of the target is first obtained using the lower precision laser scanner head. More detailed target shape can then be obtained using the higher precision laser scanner head.

Here, the high precision laser scanner head is mounted on a robot arm or on a multi-axis stage which moves the high precision laser scanner head to a suitable position for measurement based on the obtained rough shape in order to obtain necessary shape data. In this manner, it is possible to measure the shape automatically and with high precision for a target having a large size such that it is difficult to measure the entire target by the high precision laser scanner head alone.

In the above description, a case is shown where two types of laser scanner heads with different precision are used, but it is also possible to use an increased number of laser scanner heads. Also, it is obviously possible to use other three dimensional shape measurement means based on other methods in place of the laser scanner heads, such as, for example, three-dimensional measurement means using an active stereo method which is already described or a Moire method.

As described, according to the present invention, by using both rough shape information and detailed shape information obtained by light irradiation, it is possible to obtain good three-dimensional shape measurements for both concave shape and dark colored section and mirror reflective section.

Moreover, by using the rough shape information, it is possible to reduce the number of projection patterns in the space coding method or to easily remove the spike noise in the triangulation method using a laser light irradiation.

What is claimed is:

1. A three dimensional modeling apparatus for generating three dimensional shape data of a three dimensional object, comprising:

projection means for projecting coded pattern light onto said three dimensional object;

image input means for inputting images of said three dimensional object including a first image capturing device and a second image capturing device;

rough shape calculation means for calculating a rough shape of said three dimensional object;

detailed shape calculation means for calculating a detailed shape from said images; and three dimensional shape data generating means for generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

2. A three dimensional modeling apparatus for generating three dimensional shape data of a three dimensional object, comprising:

projection means for projecting coded pattern light onto said three dimensional object;

image input means for inputting images of said three dimensional object including a first image capturing device and a second image capturing device;

rough shape input means for inputting a rough shape of said three dimensional object;

detailed shape calculation means for calculating a detailed shape from said images; and three dimensional shape data generating means for generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

3. A three dimensional modeling apparatus for generating three dimensional shape data of a three dimensional object, comprising:

image input means for inputting images of said three dimensional object including a first image capturing device and a second image capturing device, said images being obtained by projecting coded pattern light onto said three dimensional object;

rough shape calculation means for calculating a rough shape from said images;

detailed shape calculation means for calculating a detailed shape from said images; and three dimensional shape data generating means for generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

4. A three dimensional modeling apparatus for generating three dimensional shape data of a three dimensional object, comprising:

image input means for inputting images of said three dimensional object including a first image capturing device and a second image capturing device, said images being obtained by projecting coded pattern light onto said three dimensional object;

rough shape input means for inputting a rough shape of said three dimensional object;

detailed shape calculation means for calculating a detailed shape from said images; and three dimensional shape data generating means for generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

5. A three dimensional modeling apparatus according to claim 1, wherein said three dimensional shape data generating means determines the final three dimensional shape data based on the following rule; if the detailed shape exists inside the rough shape, then the detailed shape is the final three dimensional shape data of said object, otherwise the rough shape is taken as the final three dimensional shape data of said object.

6. A three dimensional modeling apparatus according to claim 1, wherein said three dimensional shape data generating means obtains a region where the object surface can exist based on the rough shape, to generate three dimensional shape data of said three dimensional object based on the rough shape, the detailed shape, and the region where the object surface can exist.

7. A three dimensional modeling apparatus according to claim 1,
wherein said detailed shape calculation means obtains a plurality of object surface location candidates from the images.

8. A three dimensional modeling apparatus according to claim 1,
wherein said detailed shape calculation means sets a region where the object surface cannot exist in a portion inside the rough shape and determines a region inside the rough shape other than said region where the object surface cannot exist as a region where the object surface can exist, to generate three dimensional shape data of said three dimensional object based on the rough shape, the detailed shape, and the region where the object surface can exist.

9. A three dimensional modeling apparatus according to claim 1,
wherein the rough shape is calculated by said rough shape calculation means based on silhouette information obtained from the images input by said image input means.

10. A three dimensional modeling apparatus according to claim 1,
wherein said detailed shape calculation means extracts a pattern projected region and a pattern border region in said images to calculate the detailed shape of said three dimensional object based on these regions.

11. A three dimensional modeling apparatus according to claim 1,
wherein said image input means performs image input from at least two points at different locations,
said detailed shape calculation means extracts a portion in said images where color or density changes, and
matching of portions where color or density changes is performed between images, to calculate the three dimensional shape of said three dimensional object.

12. A three dimensional modeling apparatus according to claim 1,
wherein said pattern light for projection includes multi-color patterns in which adjacent patterns have different colors having a hue difference of at least 90 degree or more, or a brightness difference of 0.3 or more, when the colors are represented in an HSV space.

13. A three dimensional modeling apparatus according to claim 1,
wherein said matching of the portions where color or density changes is obtained based on properties of the portions where color or density changes, which are obtained from the images.

14. A three dimensional modeling apparatus according to claim 13,
wherein the property of the portion where color or density changes is color information regarding portions located to the left and right of, or above and below, said portion where color or density changes in said images.

15. A three dimensional modeling apparatus according to claim 13,
wherein averaging is performed on the images when said property is obtained.

16. A three dimensional modeling apparatus according to claim 15,
wherein said averaging is performed for each of divided regions where color density changes of the images.

17. A three dimensional modeling apparatus according to claim 1, further comprising moving means for moving said projection means and said image input means.

18. A three dimensional modeling apparatus according to claim 17, wherein said moving means moves said projection means and said image input means based on said rough shape.

19. A three dimensional modeling apparatus according to claim 3,
wherein said image input means performs image input where the images are captured at least two different points at different locations,
said detailed shape calculation means extracts a portion in said images where color or density changes, and
matching of potions where color or density changes is performed between images, to calculate the three dimensional shape of said three dimensional object.

20. A three dimensional modeling method for generating three dimensional shape data of a three dimensional object, comprising:
projecting coded pattern light onto said three dimensional object;
inputting images of said three dimensional object using a first image capturing device and a second image capturing device;
calculating a rough shape from said images;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

21. A three dimensional modeling method for generating three dimensional shape data of a three dimensional object, comprising:
projecting coded pattern light onto said three dimensional object;
inputting images of said three dimensional object using a first image capturing device and a second image capturing device;
capturing a rough shape of said three dimensional object;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

22. A three dimensional modeling method for generating three dimensional shape data of a three dimensional object, comprising:
inputting images of said three dimensional object using a first image capturing device and a second image capturing device, said images being obtained by projecting pattern light onto said three dimensional object;
calculating a rough shape from said images;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

23. A three dimensional modeling method for generating three dimensional shape data of a three dimensional object, comprising:
inputting images of said three dimensional object using a first image capturing device and a second image capturing device, said images being obtained by projecting pattern light onto said three dimensional object;
capturing a rough shape of said three dimensional object;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

24. A three dimensional modeling method according to claim 20,
wherein generating three dimensional shape data includes determining the final three dimensional shape data based on the following rule; if the detailed shape exists inside the rough shape, then the detailed shape is the final three dimensional shape data of said object, otherwise the rough shape is taken as the final three dimensional shape data of said object.

25. A three dimensional modeling method according to claim 20,
wherein generating three dimensional shape data includes obtaining a region where the object surface can exist based on the rough shape, to generate three dimensional shape data of said three dimensional object based on the rough shape, the detailed shape, and the region where the object surface can exist.

26. A three dimensional modeling method according to claim 20,
wherein calculating detailed shape includes obtaining a plurality of object surface location candidates from the images.

27. A three dimensional modeling method according to claim 20,
wherein calculating detailed shape includes setting a region where the object surface cannot exist in a portion inside the rough shape and determining a region inside the rough shape other than said region where the object surface cannot exist as a region where the object surface can exist, to generate three dimensional shape data of said three dimensional object based on the rough shape, the detailed shape, and the region where the object surface can exist.

28. A three dimensional modeling method according to claim 20,
wherein the rough shape is calculated by said rough shape calculation means based on silhouette information obtained from the images input by said step of inputting an image.

29. A three dimensional modeling method according to claim 20,
wherein calculating the detailed shape includes extracting a pattern projected region and a pattern border region in said images to calculate the detailed shape of said three dimensional object based on these regions.

30. A three dimensional modeling method according to claim 29,
wherein said pattern light has a plurality of binary patterns.

31. A three dimensional modeling method according to claim 29,
wherein inputting an image includes performing image input from at least two positions.

32. A three dimensional modeling method according to claim 20,
wherein inputting an image includes performing image input where the images are captured at least two points at different locations,
said calculating a detailed shape includes extracting a portion in said images where color or density change, and
matching portions where color or density changes between images, to calculate the three dimensional shape of said three dimensional object.

33. A three dimensional modeling method according to claim 32,
wherein said pattern light for projection includes multi-color patterns in which adjacent patterns have different colors having a hue difference of at least 90 degrees or more, or a brightness difference of 0.3 or more, when the colors are represented in an HSV space.

34. A three dimensional modeling method according to claim 20,
wherein said matching of the portions where color or density changes is obtained based on properties of the portions where color or density changes, which are obtained from the images.

35. A three dimensional modeling method according to claim 34,
wherein the property of the portion where color or density changes is color information regarding portions located to the left and right of, or above and below, said portion where color or density changes in said images.

36. A three dimensional modeling method according to claim 34,
wherein averaging is performed on the images when said property is obtained.

37. A three dimensional modeling method according to claim 36,
wherein said averaging is performed for each of divided regions where color density changes of the images.

38. A computer readable medium having a program recorded therein for causing a computer to generate three dimensional shape data of a three dimensional object, said program comprising:
controlling pattern light projection section connected to said computer for projecting coded pattern light onto said three dimensional object;
inputting images of said three dimensional object using a first image capturing device and a second image capturing device;
calculating a rough shape from said images;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

39. A computer readable medium having a program recorded therein for causing a computer to generate three dimensional shape data of a three dimensional object, said program comprising:
controlling a pattern light projection section connected to said computer for projecting coded pattern light onto said three dimensional object;
inputting images of said three dimensional object using a first image capturing device and a second image capturing devive;
capturing a rough shape of said three dimensional object;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

40. A computer readable medium having a program recorded therein for causing a computer to generate three dimensional shape data of a three dimensional object, said program comprising:
inputting images of said three dimensional object using a first image capturing device and a second image capturing device, which are obtained by projecting coded pattern light onto said three dimensional object;
calculating a rough shape from said images;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

41. A computer readable medium having a program recorded therein for causing a computer to generate three dimensional shape data of a three dimensional object, said program comprising:
inputting images of said three dimensional object using a first image capturing device and a second image capturing device, which are obtained by projecting coded pattern light onto said three dimensional object;
capturing a rough shape of said three dimensional object;
calculating a detailed shape from said images; and
generating three dimensional shape data of said three dimensional object based on said rough shape and said detailed shape, wherein said three dimensional shape data generating means determines said detailed shape using at least one final object surface location candidate selected from a plurality of object surface location candidates based on matching a coded light pattern region of a first image captured by the first image capturing device to a predetermined coded light pattern region of a second image captured by the second image capturing device and determining that the at least one final object surface location candidate is located in a predetermined region where the object surface can exist, said three dimensional shape data generating means generating three dimensional shape data of said three dimensional object based on said at least one final object surface location candidate.

42. A computer readable medium having a three dimensional modeling program recorded therein according to claim 38, wherein generating three dimensional shape data includes determining the final three dimensional shape data based on the following rule; if the detailed shape exists inside the rough shape, then the detailed shape is the final three dimensional shape data of said object, otherwise the rough shape is taken as the final three dimensional shape data of said object.

43. A computer readable medium having a three dimensional modeling program recorded therein according to claim 38, wherein generating three dimensional shape data includes obtaining a region where the object surface can exist based on the rough shape, to generate three dimensional shape data of said three dimensional object based on the rough shape, the detailed shape, and the region where the object surface can exist.

44. A computer readable medium having a three dimensional modeling program recorded therein according to claim 38, wherein calculating a detailed shape includes obtaining a plurality of object surface location candidates from the images.

45. A computer readable medium having a three dimensional modeling program recorded therein according to claim 38, wherein calculating a detailed shape includes setting a region where the object surface cannot exist in a portion inside the rough shape and determining a region inside the rough shape other than said region where the object surface cannot exist as a region where the object surface can exist, to generate three dimensional shape data of said three dimensional object based on the rough shape, the detailed shape, and the region where the object surface can exist.

46. A computer readable medium having a three dimensional modeling program recorded therein according to claim 38, wherein the rough shape is calculated by calculating a rough shape based on silhouette information obtained from the object image input by inputting an image.

* * * * *